US012165625B2

(12) United States Patent
Zhang et al.

(10) Patent No.: US 12,165,625 B2
(45) **Date of Patent: *Dec. 10, 2024**

(54) SYSTEMS AND METHODS FOR NOISE REDUCTION USING SUB-BAND NOISE REDUCTION TECHNIQUE

(71) Applicant: SHENZHEN SHOKZ CO., LTD., Guangdong (CN)

(72) Inventors: Chengqian Zhang, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/501,230

(22) Filed: Nov. 3, 2024

(65) Prior Publication Data

US 2024/0071358 A1 Feb. 29, 2024

Related U.S. Application Data

(63) Continuation of application No. 17/449,653, filed on Sep. 30, 2021, now Pat. No. 11,817,077, which is a (Continued)

(51) Int. Cl.
*G10K 11/178* (2006.01)
*G10L 21/038* (2013.01)

(52) U.S. Cl.
CPC .. *G10K 11/17854* (2018.01); *G10K 11/17881* (2018.01); *G10L 21/038* (2013.01); (Continued)

(58) Field of Classification Search
CPC ....... G10K 11/17854; G10K 11/17881; G10K 2210/3026; G10K 2210/3027; G10K 2210/3028; G10K 2210/3056
See application file for complete search history.

(56) References Cited

U.S. PATENT DOCUMENTS 5,410,605 A * 4/1995 Sawada ............ G10K 11/17825
381/71.14
8,131,541 B2 3/2012 Yen et al.
(Continued)

FOREIGN PATENT DOCUMENTS

CN 105390142 A 3/2016
CN 107291663 A 10/2017
(Continued)

OTHER PUBLICATIONS

Machine translation of JP2015158542A, 13 pages. (Year: 2015).*
(Continued)

*Primary Examiner* — Ping Lee
(74) *Attorney, Agent, or Firm* — METIS IP LLC

(57) ABSTRACT

A noise reduction system is provided. The noise reduction system may include a sub-band noise sensor, a plurality of sub-band noise reduction modules, and an output module. The sub-band noise sensor may be configured to detect a noise and generate a plurality of sub-band noise signals in response to the detected noise. Each of the plurality of sub-band noise signals may have a distinctive sub-band of the frequency band of the noise. Each of the sub-band noise reduction modules may be configured to receive one of the sub-band noise signals from the sub-band noise sensor and generate a sub-band noise correction signal for reducing the received sub-band noise signal. The output module may be configured to receive the sub-band noise correction signals and output a noise correction signal for reducing the noise based on the sub-band noise correction signals.

15 Claims, 15 Drawing Sheets

220B

Related U.S. Application Data continuation of application No. 17/170,916, filed on Feb. 9, 2021, now Pat. No. 11,164,556, which is a continuation of application No. PCT/CN2019/109301, filed on Sep. 30, 2019.

(52) U.S. Cl.
CPC ................ *G10K 2210/3026* (2013.01); *G10K 2210/3027* (2013.01); *G10K 2210/3028* (2013.01); *G10K 2210/3056* (2013.01)

(56) References Cited

U.S. PATENT DOCUMENTS

| | | | |
|---|---|---|---|
| 8,958,572 B1 | 2/2015 | Solbach | |
| 9,343,073 B1 | 5/2016 | Murgia et al. | |
| 11,164,556 B2 * | 11/2021 | Zhang | G10K 11/17854 |
| 11,817,077 B2 * | 11/2023 | Zhang | G10L 21/0208 |
| 2011/0007907 A1 * | 1/2011 | Park | G10K 11/17855 381/71.8 |
| 2011/0222698 A1 | 9/2011 | Asao et al. | |
| 2012/0014532 A1 | 1/2012 | Kimura | |
| 2013/0094657 A1 | 4/2013 | Brammer et al. | |
| 2013/0259253 A1 | 10/2013 | Alves et al. | |
| 2016/0066087 A1 | 3/2016 | Solbach et al. | |
| 2016/0300559 A1 | 10/2016 | Lee et al. | |
| 2017/0004841 A1 | 1/2017 | Jensen | |
| 2017/0111737 A1 | 4/2017 | Painter et al. | |
| 2017/0195496 A1 | 7/2017 | Awano et al. | |
| 2017/0287461 A1 | 10/2017 | Ku | |
| 2019/0285673 A1 * | 9/2019 | Skovenborg | G10L 25/18 |
| 2019/0341017 A1 * | 11/2019 | Plummer | G10K 11/17823 |

FOREIGN PATENT DOCUMENTS

| | | |
|---|---|---|
| JP | 06261389 A | 9/1994 |
| JP | H11259078 A | 9/1999 |
| JP | 2015093611 A | 5/2015 |
| JP | 2015158542 A | 9/2015 |
| WO | 2020051786 A1 | 3/2020 |

OTHER PUBLICATIONS

Notice of Preliminary Rejection in Korean Application No. 10-2022-7014528 mailed on Aug. 1, 2024, 16 pages.
International Search Report in PCT/CN2019/109301 mailed on May 27, 2020, 4 pages.
Written Opinion in PCT/CN2019/109301 mailed on May 27, 2020, 5 pages.
The Extended European Search Report in European Application No. 19947586.4 mailed on Jun. 13, 2022, 10 pages.
First Office Action in Russian Application No. 2022105404 mailed on Dec. 5, 2022, 14 pages.
2020 Notice of Reasons for Rejection in Japanese Application No. 2022-519747 mailed on May 8, 2020, 14 pages.
Notice of Reasons for Rejection in Japanese Application No. 2022-519747 mailed on Nov. 20, 2020, 14 pages.

* cited by examiner

SYSTEMS AND METHODS FOR NOISE REDUCTION USING SUB-BAND NOISE REDUCTION TECHNIQUE

CROSS-REFERENCE TO RELATED APPLICATION

This application is a continuation of U.S. patent application Ser. No. 17/449,653, filed on Sep. 30, 2021, which is a continuation of U.S. patent application Ser. No. 17/170,916 (now U.S. Pat. No. 11,164,556), filed on Feb. 9, 2021, which is a continuation of International Application No. PCT/CN2019/109301, filed on Sep. 30, 2019, the contents of which are hereby incorporated by reference in its entirety.

TECHNICAL FIELD

The present disclosure generally relates to noise reduction, particularly to systems and methods for noise reduction using a sub-band noise reduction technique.

BACKGROUND

Noise reduction is often needed to suppress a noise (e.g., an unwanted sound which is unpleasant, loud, or disruptive to hearing). Conventionally, the noise may be reduced in a passive manner by, for example, eliminating (or partially eliminating) the source of the noise, blocking the transmission of the noise, and/or preventing the ear of a user from hearing the noise, or the like, or any combination thereof. These noise reduction techniques may be passive and have a poor noise reduction effect under some conditions (e.g., when the noise has a low-frequency below a threshold frequency). Recently, an active noise reduction (ANR) technique has been adopted to reduce noises in an active manner by generating a noise reduction signal (e.g., a signal having an inversed phase to the noise to be reduced). A conventional ANR device may utilize a full-band noise reduction technique, which generates a single noise correction signal with a frequency band covering the frequency band of the noise to suppress the noise. A sub-band decomposition technique may be used in noise reduction to improve the noise reduction effect. Thus, it is desirable to provide systems and methods for noise reduction using a sub-band noise reduction technique.

SUMMARY

A system for noise reduction is provided. The system may include a sub-band noise sensor, a plurality of sub-band noise reduction modules, and an output module. The sub-band noise sensor may be configured to detect a noise and generate a plurality of sub-band noise signals in response to the detected noise. Each of the sub-band noise signals may have a distinctive sub-band of the frequency band of the noise. Each of the sub-band noise reduction modules may be configured to receive one of the sub-band noise signals from the sub-band noise sensor and generate a sub-band noise correction signal for reducing the received sub-band noise signal. The output module may be configured to receive the sub-band noise correction signals and output a noise correction signal for reducing the noise based on the sub-band noise correction signals.

In some embodiments, the sub-band noise sensor may include an acoustic-electric transducer and a band dividing module. The acoustic-electric transducer may be configured to detect the noise and convert the noise into an electrical signal. The band dividing module may be coupled to the acoustic-electric transducer and configured to divide the electrical signal into the sub-band noise signals.

In some embodiments, the band dividing module may include a plurality of band-pass filters. Each of the band-pass filters may have a unique frequency response and be configured to generate one of the sub-band noise signals.

In some embodiments, a first band-pass filter of the band-pass filters may have a first frequency response and be configured to generate a first sub-band noise signal of the sub-band noise signals. A second band-pass filter of the band-pass filters may have a second frequency response and be configured to generate a second sub-band noise signal of the sub-band noise signals. The second sub-band noise signal be may be adjacent to the first sub-band noise signal among the sub-band noise signals in the frequency domain. The first frequency response and the second frequency response may intersect at a frequency point which is near at least one of a half-power point of the first frequency response or a half-power point of the second frequency response.

In some embodiments, the first frequency response of the first band-pass filter and the second frequency response of the second band-pass filter may have a same frequency bandwidth or different frequency bandwidths.

In some embodiments, the sub-band noise reduction module may be integrated into the band dividing module.

In some embodiments, the sub-band noise sensor may include a plurality of acoustic-electric transducers and a plurality of sampling modules. Each of the acoustic-electric transducers may have a unique frequency response and be configured to generate a sub-band noise electrical signal by processing the noise. Each of the sampling modules may be configured to receive one sub-band noise electrical signal of the sub-band noise electrical signals, and sample the received sub-band noise electrical signal to generate one sub-band noise signal of the sub-band noise signals.

In some embodiments, an acoustic-electric transducer of the acoustic-electric transducers may include an acoustic channel component and a sound sensitive component. The acoustic channel component may be configured to filter the noise to generate a sub-band noise. The sound sensitive component may be configured to convert the sub-band noise into a sub-band noise electrical signal.

In some embodiments, an acoustic-electric transducer of the acoustic-electric transducers may include a sound sensitive component. The sound sensitive component may be configured to convert the noise to a sub-band noise electrical signal.

In some embodiments, a first acoustic-electric transducer of the acoustic-electric transducers may have a first frequency response and be configured to generate a sub-band noise electrical signal corresponding to a first sub-band noise signal of the sub-band noise signals. A second acoustic-electric transducer of the acoustic-electric transducers may have a second frequency response and be configured to generate a sub-band noise electrical signal corresponding to a second sub-band noise signal of the sub-band noise signals. The second sub-band noise signal may be adjacent to the first sub-band noise signal among the sub-band noise signals in the frequency domain. The first frequency response and the second frequency response may intersect at a frequency point which is near at least one of a half-power point of the first frequency response or a half-power point of the second frequency response.

In some embodiments, the first frequency response of the first acoustic-electric transducer and the second frequency response of the second acoustic-electric transducer have a same frequency bandwidth or different frequency bandwidths.

In some embodiments, the frequency bands of the sub-band noise signals generated by the sub-band noise sensor may cover the frequency band of the noise.

In some embodiments, at least one sub-band noise reduction module of the sub-band noise reduction modules may include a phase modulator and an amplitude modulator. The phase modulator may be configured to receive the corresponding sub-band noise signal, and generate a phase-modulated signal by modulating the phase of the corresponding sub-band noise signal. The amplitude modulator may be configured to receive the phase-modulated signal from the phase modulator, and generate the sub-band noise correction signal for reducing the corresponding sub-band noise signal by modulating the amplitude of the phase-modulated signal.

In some embodiments, the phase modulation of the corresponding sub-band noise signal may include an inversion of the phase of the corresponding sub-band noise signal, and optionally a compensation of a phase displacement of the corresponding sub-band noise signal in its transmission from the sub-band noise sensor to the phase modulator.

In some embodiments, at least one sub-band noise reduction module of the sub-band noise reduction modules may include an amplitude modulator and a phase modulator. The amplitude modulator may be configured to receive the corresponding sub-band noise signal, and generate an amplitude modulated signal by modulating the amplitude of the corresponding sub-band noise signal. The phase modulator may be configured to receive the amplitude-modulated signal from the amplitude modulator, and generate the sub-band noise correction signal for reducing the corresponding sub-band noise signal by modulating the phase of the amplitude-modulated signal.

In some embodiments, the phase modulation of the amplitude-modulated signal may include an inversion of the phase of the amplitude-modulated signal, and optionally a compensation of a phase displacement of the corresponding sub-band noise signal in its transmission from the sub-band noise sensor to the phase modulator.

In some embodiments, the noise correction signal may include the sub-band noise correction signals. The output module may include a plurality of output units. Each of the output units may be configured to receive one of the sub-band noise correction signals generated by the sub-band noise reduction modules and output the received sub-band noise correction signal.

In some embodiments, the output module may be configured to receive the sub-band noise correction signals from the sub-band noise reduction modules. The output module may be also configured to combine the sub-band noise correction signals to generate the noise correction signal. The output module may be also configured to output the noise correction signal.

In some embodiments, the noise may include an ambient noise.

In some embodiments, the system may further include a residual noise sensor and a residual noise reduction module. The residual noise sensor may be configured to detect a residual noise and generate a residual noise signal in response to the detected residual noise. A distance between the residual noise sensor and the output module may be shorter than a distance between the sub-band noise sensor and the output module. The residual noise reduction module may be configured to receive the residual noise signal and generate a residual noise correction signal for reducing the residual noise.

In some embodiments, the output module may be further configured to receive the residual noise correction signal and output the residual noise correction signal. The system may further include a second output module configured to receive the residual noise correction signal and output the residual noise correction signal.

In some embodiments, the residual noise signal generated by the residual noise sensor may include a plurality of sub-band residual noise signals, and the residual noise correction signal may include a plurality of sub-band residual noise correction signals. Each of the sub-band residual noise correction signals may be configured to reduce one of the sub-band residual noise signals.

In some embodiments, the system may include a residual noise sensor and a feedback module. The residual noise sensor may be configured to detect a residual noise and generate a residual noise signal in response to the detected residual noise. A distance between the residual noise sensor and the output module may be shorter than a distance between the sub-band noise sensor and the output module. A feedback module may be configured to adjust the sub-band noise reduction modules according to the residual noise.

In some embodiments, the sub-band noise sensor may be mounted near or within the output module, and the noise may include a residual noise.

In some embodiments, the sub-band noise signals may be analog signals, and the sub-band noise reduction modules may include analog signal processing components.

In some embodiments, the sub-band noise signals may be digital signals, and the sub-band noise reduction modules may include digital signal processing components.

In some embodiments, the output module may include an electro-acoustic transducer configured to convert the noise correction signal into an audio signal and output the audio signal.

In some embodiments, the output module may include a signal processing unit and an electro-acoustic transducer. The signal processing unit may be configured to process the noise correction signal. The electro-acoustic transducer may be configured to convert the processed noise correction signal into an audio signal and output the audio signal.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1A:
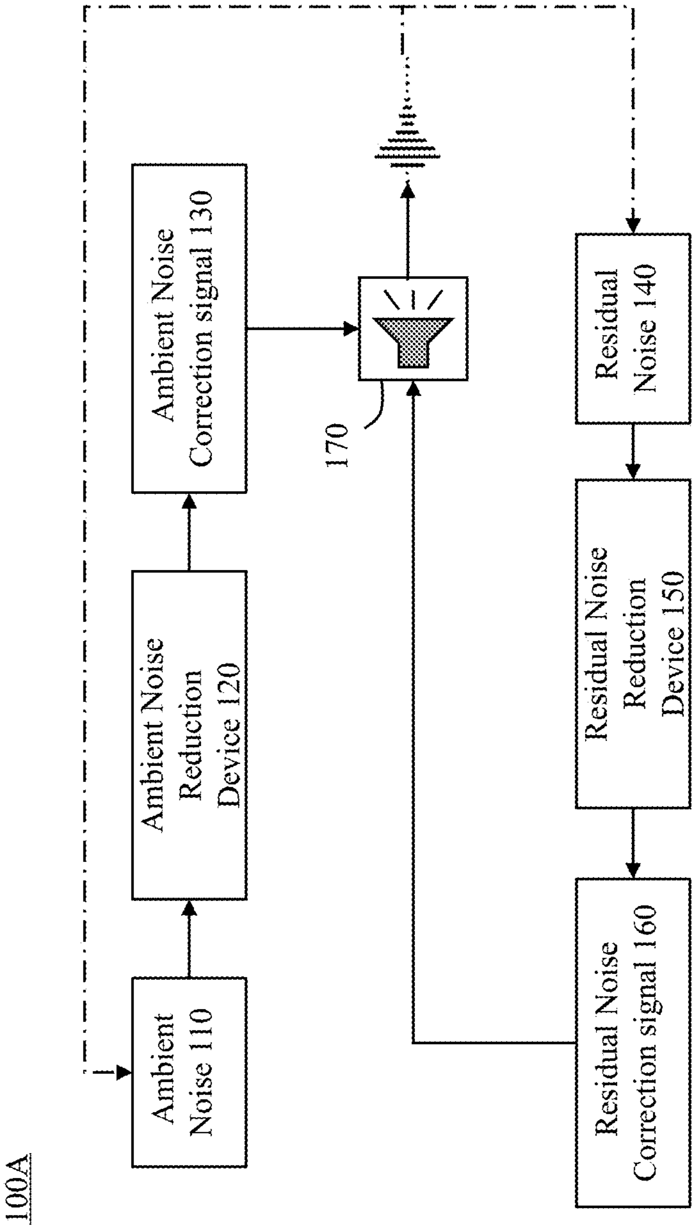
FIG. 1A is a schematic diagram illustrating an exemplary noise reduction system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "unit," "module," and/or "block" used herein are one method to distinguish different components, elements, parts, section or assembly of different level in ascending order. However, the terms may be displaced by other expression if they may achieve the same purpose.

It will be understood that when a unit, engine, module, or block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

Spatial and functional relationships between elements (for example, between layers) are described using various terms, including "connected," "engaged," "interfaced," and "coupled." Unless explicitly described as being "direct," when a relationship between first and second elements is described in the present disclosure, that relationship includes a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. In addition, a spatial and functional relationship between elements may be achieved in various ways. For example, a mechanical connection between two elements may include a welded connection, a key connection, a pin connection, an interference fit connection, or the like, or any combination thereof. Other words used to describe the relationship between elements should be interpreted in a like fashion (e.g., "between," versus "directly between," "adjacent," versus "directly adjacent," etc.).

An aspect of the present disclosure relates to a noise reduction system. The noise reduction system may include a sub-band noise sensor, a plurality of sub-band noise reduction modules, and an output module. The sub-band noise sensor may be configured to detect a noise and generate a plurality of sub-band noise signals in response to the detected noise. Each of the plurality of sub-band noise signals may have a distinctive sub-band of the frequency band of the noise. Each of the sub-band noise reduction modules may be configured to receive one of the sub-band noise signals from the sub-band noise sensor and generate a sub-band noise correction signal for reducing the received sub-band noise signal. The output module may be configured to receive the sub-band noise correction signals and output a noise correction signal for reducing the noise.

According to some embodiments of the present disclosure, the system may reduce the noise using a sub-band noise reduction technique, which may perform noise reduction in a plurality of sub-bands of the frequency band of the noise. Compared with a full band noise reduction technique which performs noise reduction directly on the entire frequency band of the noise, the sub-band noise reduction technique may improve the noise reduction effect. In some embodiments, the noise reduction system may be used in various scenarios to reduce various types of noises. For example, an audio broadcast device may include an ambient noise reduction device for reducing an ambient noise and a residual noise reduction device for reducing a residual noise after a suppression of the ambient noise, each or one of which may be implemented by one or more components of the noise reduction system described above. The combination of the ambient noise reduction device and the residual noise reduction device may efficiently reduce an unwanted sound, thereby improving the performance of the audio broadcast device.

FIG. 1A is a schematic diagram illustrating an exemplary noise reduction system 100A according to some embodiments of the present disclosure. The noise reduction system 100A may be configured to reduce or cancel a noise (e.g., an unwanted sound that is unpleasant, loud, or disruptive to hearing). The noise reduction system 100A may be applied in various areas and/or devices, such as a headphone (e.g., a noise-canceling headphone, a bone conduction headphone), a muffler, an anti-snoring device, or the like, or any combination thereof. In some embodiments, the noise reduction system 100A may be an active noise reduction system which reduces a noise by generating a noise reduction signal designed to reduce the noise (e.g., a signal that has an inverted phase to the noise).

As shown in FIG. 1A, the noise reduction system 100A may include an ambient noise reduction device 120, a residual noise reduction device 150, and an output module 170. In some embodiments, two or more components of the noise reduction system 100A may be connected to and/or communicate with each other. For example, each of the ambient noise reduction device 120 and the residual noise reduction device 150 may be electrically connected to the output module 170. As used herein, a connection between two components may include a wireless connection, a wired connection, any other communication connection that can enable data transmission and/or reception, and/or any combination of these connections. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or a combination thereof. The wired connection may include, for example, a coaxial cable, a communication cable (e.g., a telecommunication cable), a flexible cable, a spiral cable, a non-metallic sheath cable, a metal sheath cable, a multi-core cable, a twisted-pair cable, a ribbon cable, a shielded cable, a double-strand cable, an optical fiber, an electrical cable, an optical cable, a telephone wire, or the like, or any combination thereof.

The ambient noise reduction device 120 may be configured to reduce an ambient noise 110. For example, as illustrated in FIG. 1A, the ambient noise reduction device 120 may detect the ambient noise 110 and generate an ambient noise correction signal 130 for reducing the ambient noise 110. As used herein, an ambient noise 110 may refer to any sound other than a wanted sound. For example, the ambient noise 110 may include a background sound (e.g., a traffic noise, a wind noise, a water noise, an extraneous speech) which is present when a user is wearing an audio broadcast device (e.g., an earphone). The ambient noise 110 may be detected by the ambient noise reduction device 120 when the audio broadcast device is playing audio (e.g., music) or not playing audio.

In some embodiments, the ambient noise reduction device 120 may be configured to reduce the ambient noise 110 according to a full-band noise reduction technique or a sub-band noise reduction technique. The full-band noise technique may refer to a technique that reduces a noise by generating a single noise correction signal with a frequency band covering the frequency band of the original noise. For example, the noise correction signal may be an analog signal or digital signal that has an inversed phase to the noise. The sub-band noise technique may refer to a technique that reduces a noise by generating a plurality of sub-band noise correction signals. Each of the sub-band noise correction signals may have a distinctive sub-band of the frequency band of the noise (i.e., a frequency band which is narrower than and within the frequency band of the noise) and be configured to reduce a portion of the noise that has the distinctive sub-band.

Figure 2:
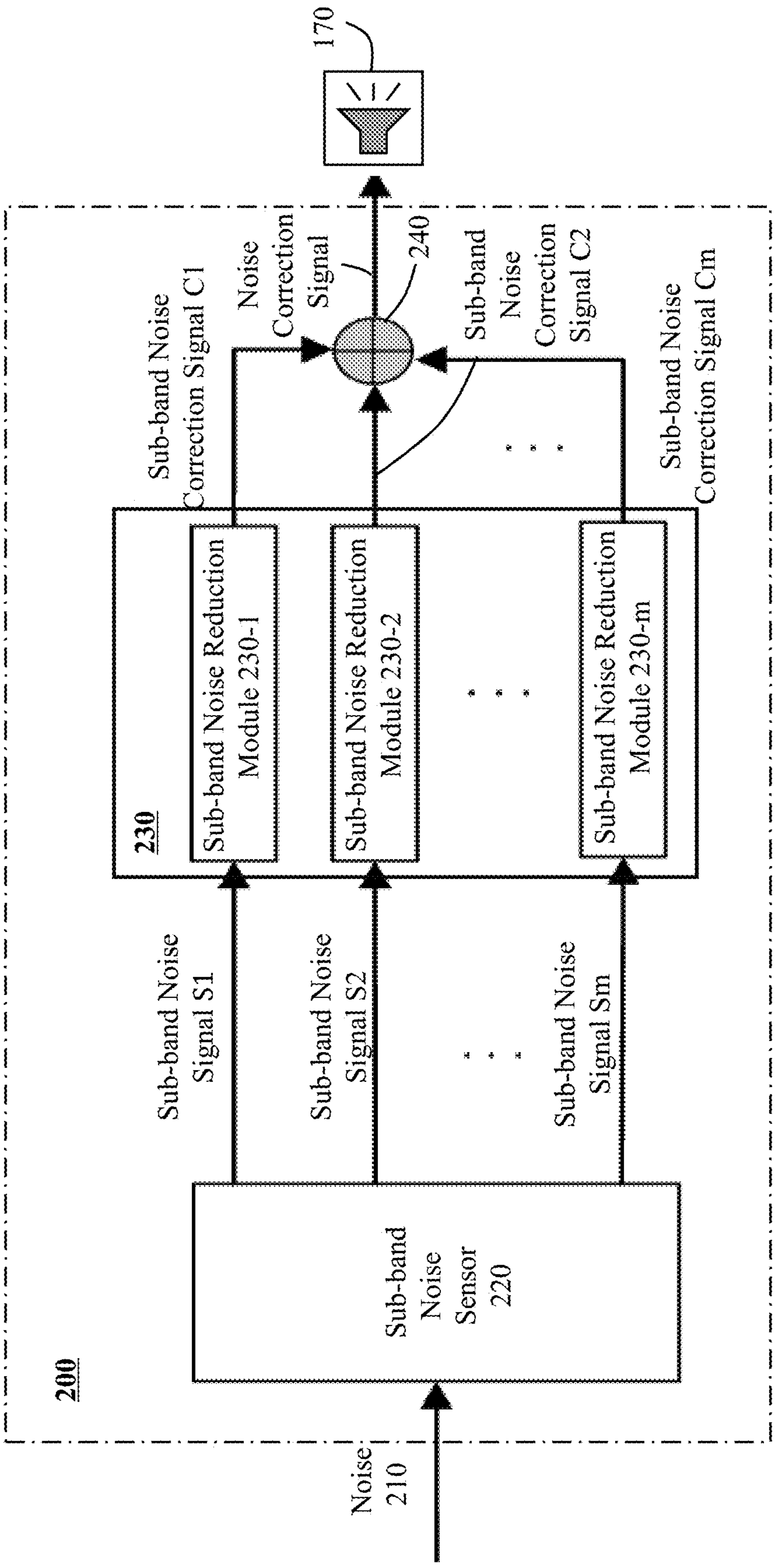
FIG. 2 is a schematic diagram illustrating an exemplary noise reduction device according to some embodiments of the present disclosure.

In some embodiments, the ambient noise reduction device 120 may include one or more components to implement the sub-band noise reduction technique. For example, the ambient noise reduction device 120 may include a first sub-band noise sensor and a plurality of first sub-band noise reduction modules. The first sub-band noise sensor may be configured to detect the ambient noise 110 and generate a plurality of sub-band ambient noise signals. The frequency band of each sub-band ambient noise signal may be narrower than and within the frequency band of the ambient noise 110. The frequency bands of different sub-band ambient noise signals may be different from each other. The first sub-band noise reduction modules may be configured to generate a plurality of sub-band ambient noise correction signals based on the sub-band ambient noise signals. Each of the sub-band ambient noise correction signals may be an analog signal or a digital signal used to reduce one of the sub-band ambient noise signals. The sub-band ambient noise correction signals may form the ambient noise correction signal 130 or be processed (e.g., combined) to generate the ambient noise correction signal 130. In some embodiments, the ambient noise reduction device 120 may be implemented by a noise reduction device 200 having one or more components as illustrated in FIG. 2.

As shown in FIG. 1, the ambient noise correction signal 130 generated by the ambient noise reduction device 120 may be transmitted to the output module 170 for output. The output module 170 may include an electro-acoustic transducer (e.g., a loudspeaker, an audio player) that may convert an electrical signal into an audio signal for suppressing the ambient noise 110. For example, the ambient noise correction signal 130 may be a first combined signal of the sub-band ambient noise correction signals. The output module 170 may directly convert the first combined signal into an audio signal for output. Alternatively, the output module 170 may include a signal processing unit and an electro-acoustic transducer. The signal processing unit may be configured to process the first combined signal, and the electro-acoustic transducer may be configured to convert the processed first combined signal into an audio signal for output. Merely by way of example, the first combined signal may be a digital signal. The signal processing unit may convert the first combined signal into a pulse width modulation (PWM) signal or an analog signal. The electro-acoustic transducer may further convert the PWM signal or the analog signal into a sound for output. In some alternative embodiments, the signal processing unit of the output module 170 may be integrated into the ambient noise reduction device 120. The ambient noise reduction device 120 may process the first combined signal and transmit the processed first combined signal to the output module 170 for output.

In some embodiments, the ambient noise correction signal 130 may include a plurality of sub-band ambient noise correction signals as aforementioned. The output module 170 may include a plurality of output units, each of which may include an electro-acoustic transducer and optionally a signal processing unit. Each of the sub-band ambient noise correction signals may be transmitted to one of the output units in parallel for output. The output of a sub-band ambient noise correction signal by an output unit may be performed in a similar manner as that of the first combined signal of the sub-band ambient noise correction signals by the output module 170 as described above.

The audio signal for reducing the ambient noise 110 outputted by the output module 170 may interface with the ambient noise 110, wherein the interference may suppress or partially suppress the ambient noise 110 as indicated by a dotted line connecting the audio signal outputted by the output module 170 and the ambient noise 110 in FIG. 1A. In some embodiments, there may be a residual noise 140 after the suppression of the ambient noise 110. The residual noise reduction device 150 may serve as a feedback mechanism of the noise reduction system 100A to reduce the residual noise 140. For example, as illustrated in FIG. 1A, the residual noise reduction device 150 may detect the residual noise 140 and generate a residual noise correction signal 160 for reducing the residual noise 140.

Figure 14:
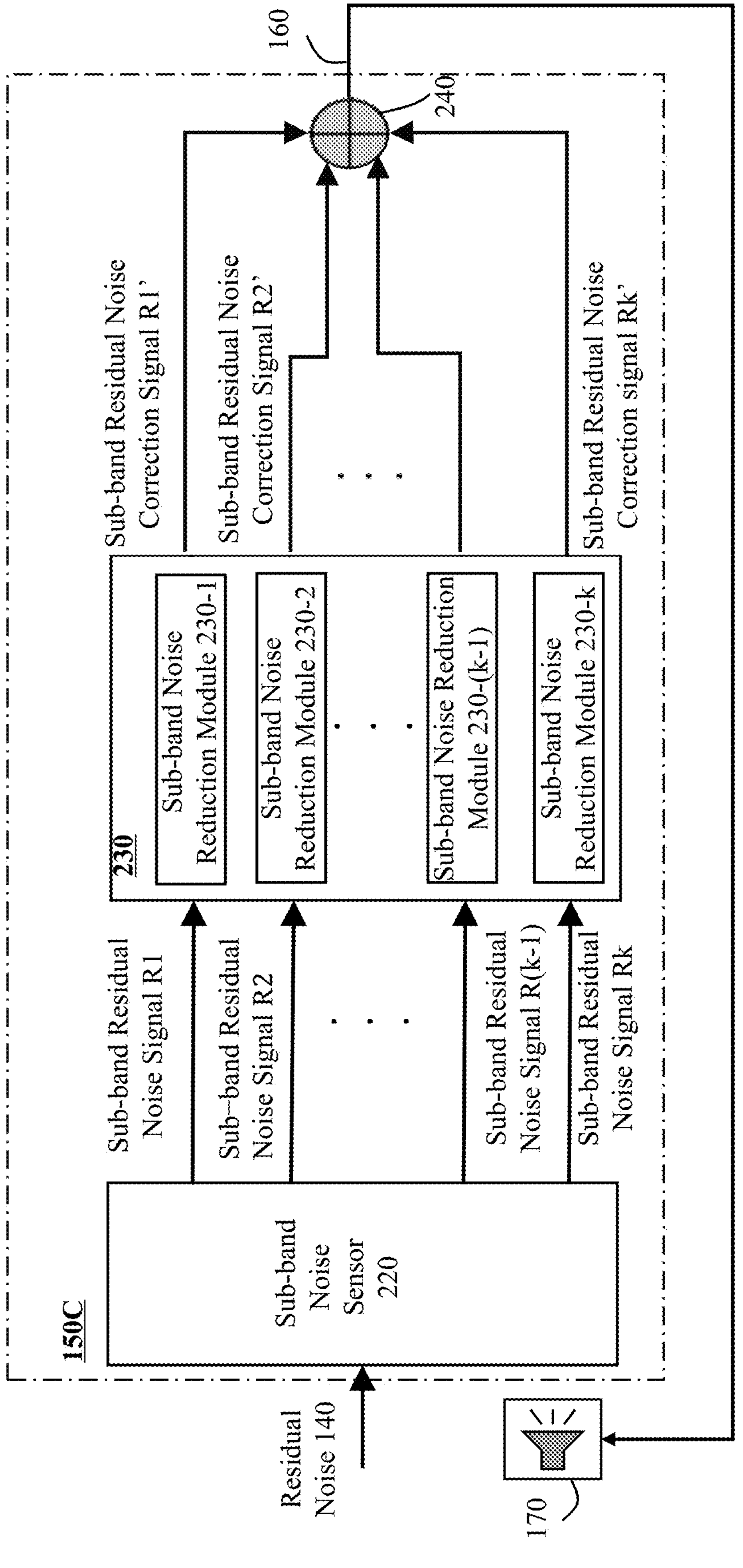
FIG. 14 is a schematic diagram illustrating an exemplary noise reduction system according to some embodiments of the present disclosure.

In some embodiments, the residual noise reduction device 150 may be configured to reduce the residual noise 140 according to a full-band noise reduction technique or a sub-band noise reduction technique as aforementioned. For example, the residual noise reduction device 150 may generate a single residual noise correction signal 160 that has a same frequency band as but an inversed phase to the residual noise 140 for reducing the residual noise 140. As another example, the residual noise reduction device 150 may include one or more components to implement the sub-band noise reduction technique, such as a second sub-band noise sensor and a plurality of second sub-band noise reduction modules. The distance between the second sub-band noise sensor may be shorter than a sensor of the ambient noise reduction device 120 for sensing the ambient noise 110 (e.g., the first sub-band noise sensor as described above), such that the second sub-band noise sensor may detect the residual noise 140. In response to the residual noise 140, the second sub-band noise sensor may generate a plurality of sub-band residual noise signals, each of which may have a distinctive sub-band of the frequency band of the residual noise 140. Each second sub-band noise reduction module may be configured to receive one of the sub-band residual noise signals from the second sub-band noise sensor and generate a sub-band residual noise correction signal for reducing the received sub-band residual noise signal. The sub-band residual noise correction signals may form the residual noise correction signal 160 or be processed (e.g., combined) to generate the residual noise correction signal 160. In some embodiments, the residual noise reduction device 150 may be implemented by a noise reduction device 200 having one or more components as illustrated in FIG. 2 and/or a residual noise reduction device 150C having one or more components as illustrated in FIG. 14.

The residual noise correction signal 160 generated by the residual noise reduction device 150 may be transmitted to the output module 170 for output. The output of the residual noise correction signal 160 may be implemented in a similar manner as the output of the ambient noise correction signal 130 as described above. For example, the output module 170 may covert the residual noise correction signal 160 into an audio signal for reducing the residual noise 140. The audio signal for reducing the residual noise 140 may be outputted together with the audio signal for reducing the ambient noise 110 as aforementioned. The audio signal for reducing the residual noise 140 may interface with the residual noise 140 as indicated by a dotted line connecting the audio signal outputted by the output module 170 and the residual noise 140 in FIG. 1A. In some embodiments, the output module 170 may output the ambient noise correction signal 130 and the residual noise reduction device 150 separately. Alternatively, the ambient noise correction signal 130 and the residual noise correction signal 160 may be combined to generate a second combined signal, which may be further outputted by the output module 170 to suppress the ambient noise 110 and the residual noise 140.

In some alternative embodiments, instead of generating the residual noise correction signal 160, the residual noise reduction device 150 may transmit a feedback signal to the ambient noise reduction device 120 according to the detected residual noise 140. For example, the feedback signal may be generated by a feedback module of the residual noise reduction device 150 and include information relating to the residual noise 140. The ambient noise reduction device 120 may adjust one more parameters relating to the generation of the ambient noise correction signal 130, so that an adjusted ambient noise correction signal 130 may be generated to suppress the ambient noise 110 more efficiently. As another example, the feedback signal may include an instruction to direct the ambient noise reduction device 120 to adjust the one or more parameters relating to the generation of the ambient noise correction signal 130. More descriptions regarding the feedback module and/or the adjustment of the parameter(s) relating to the generation of the ambient noise correction signal 130 may be found elsewhere in the present disclosure. See, e.g., FIG. 13 and relevant descriptions thereof.

In some embodiments, the noise reduction system 100A may be applied to an audio broadcast device. A component of the noise reduction system 100A may be mounted on any position of the audio broadcast device. For example, the ambient noise reduction device 120 or a portion thereof (e.g., a sensor for detecting the ambient noise 110) may be mounted outside the audio broadcast device. The output module 170 may be mounted within the audio broadcast device. The output module 170 may be configured to output noise correction signal(s) and optionally service as an output component of the audio broadcast device to output a wanted audio (e.g., music). The residual noise reduction device 150 or a portion thereof (e.g., a sensor for detecting the residual noise 140) may be mounted near or within the output module 170.

Figure 1B:
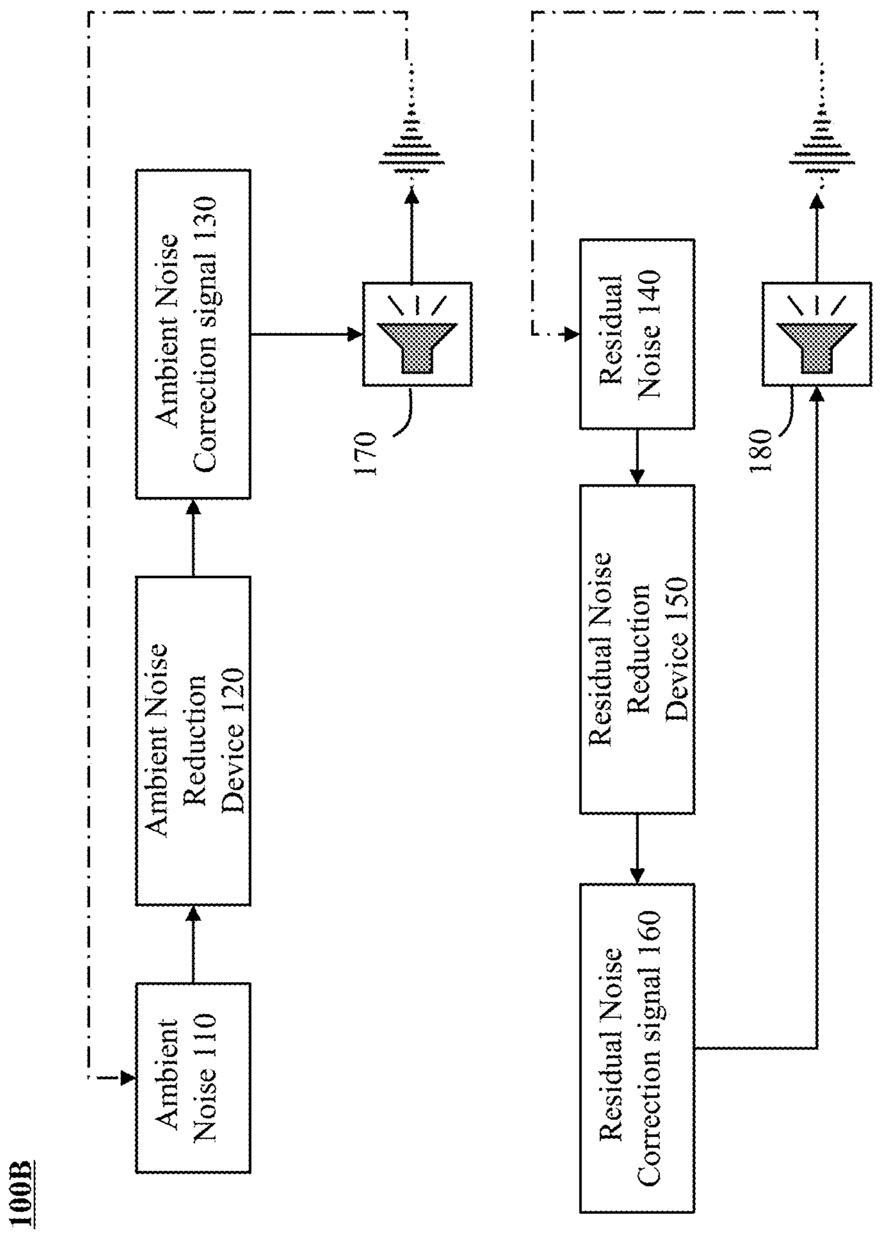
FIG. 1B is a schematic diagram illustrating an exemplary noise reduction system according to some embodiments of the present disclosure.

FIG. 1B is a schematic diagram illustrating an exemplary noise reduction system 100B according to some embodiments of the present disclosure. The noise reduction system 100B may be similar to the noise reduction system 100A as described in connection with FIG. 1A, except that the noise reduction system 100B may include the output module 170 and an additional output module 180. As shown in FIG. 1B, the output module 170 may be electrically connected to the ambient noise reduction device 120 for outputting the ambient noise correction signal 130. The output module 180 may be electrically connected to the residual noise reduction device 150 for outputting the residual noise correction signal 160.

It should be noted that the above descriptions of the noise reduction systems 100A and 100B are intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the noise reduction system 100A and/or the noise reduction system 100B may include one or more additional components. Additionally or alternatively, one or more components of the noise reduction system 100A and/or the noise reduction system 100B described above may be omitted. For example, one of the ambient noise reduction device 120 and the residual noise reduction device 150 may be omitted. As another example, two or more components of the noise reduction system 100A and/or the noise reduction system 100B may be integrated into a single component. Merely by way of example, in the noise reduction system 100B, the output module 170 may be integrated into the ambient noise reduction device 120, and/or the output module 180 may be integrated into the residual noise reduction device 150.

FIG. 2 is a schematic diagram illustrating an exemplary noise reduction device 200 according to some embodiments of the present disclosure. The noise reduction device 200 may be configured to reduce a noise 210 using a sub-band noise reduction technique as described elsewhere in this disclosure (e.g., FIG. 1A and the relevant descriptions).

As illustrated in FIG. 2, the noise reduction device 200 may include a sub-band noise sensor 220, a plurality of sub-band noise reduction modules 230, and a combination module 240. The noise reduction device 200 may be coupled to an output module 170. The sub-band noise sensor 220 may be configured to detect the noise 210 (e.g., the ambient noise 110 or the residual noise 140 as described in connection with FIG. 1) and generate a plurality of sub-band noise signals (e.g., sub-band noise signals S1 to Sm) in response to the detected noise. The "m" may be any positive integer greater than 1, such as 5, 10, 15, or the like.

The noise 210 may be an audio signal having a certain frequency band. A sub-band noise signal may refer to a signal having a frequency band narrower than and within the frequency band of the noise 210. For example, the noise 210 may have a frequency band ranging from 10 Hz to 30,000 Hz. The frequency band of a sub-band noise signal may be 100-200 HZ, which is within the frequency band of the noise 210. In some embodiments, a combination of the frequency bands of the sub-band noise signals may cover the frequency band of the noise 210. Additionally or alternatively, at least two of the sub-band noise signals may have different frequency bands. Optionally, each of the sub-band noise signals may have a distinctive frequency band different from the frequency band(s) of the other sub-band noise signal(s). Different sub-band noise signals may have a same frequency bandwidth or different frequency bandwidths. In some embodiments, an overlap between the frequency bands of a pair of adjacent sub-band noise signals in the frequency domain may be avoided, so as to improve the noise reduction effect. As used herein, two sub-band noise signal whose center frequencies are adjacent to each other among the sub-band noise signals may be regarded as being adjacent to each other in the frequency domain. More descriptions regarding the frequency bands of a pair of adjacent sub-band noise signals may be found elsewhere in the present disclosure. See, e.g., FIGS. 5A and 5B and relevant descriptions thereof.

Figure 4:
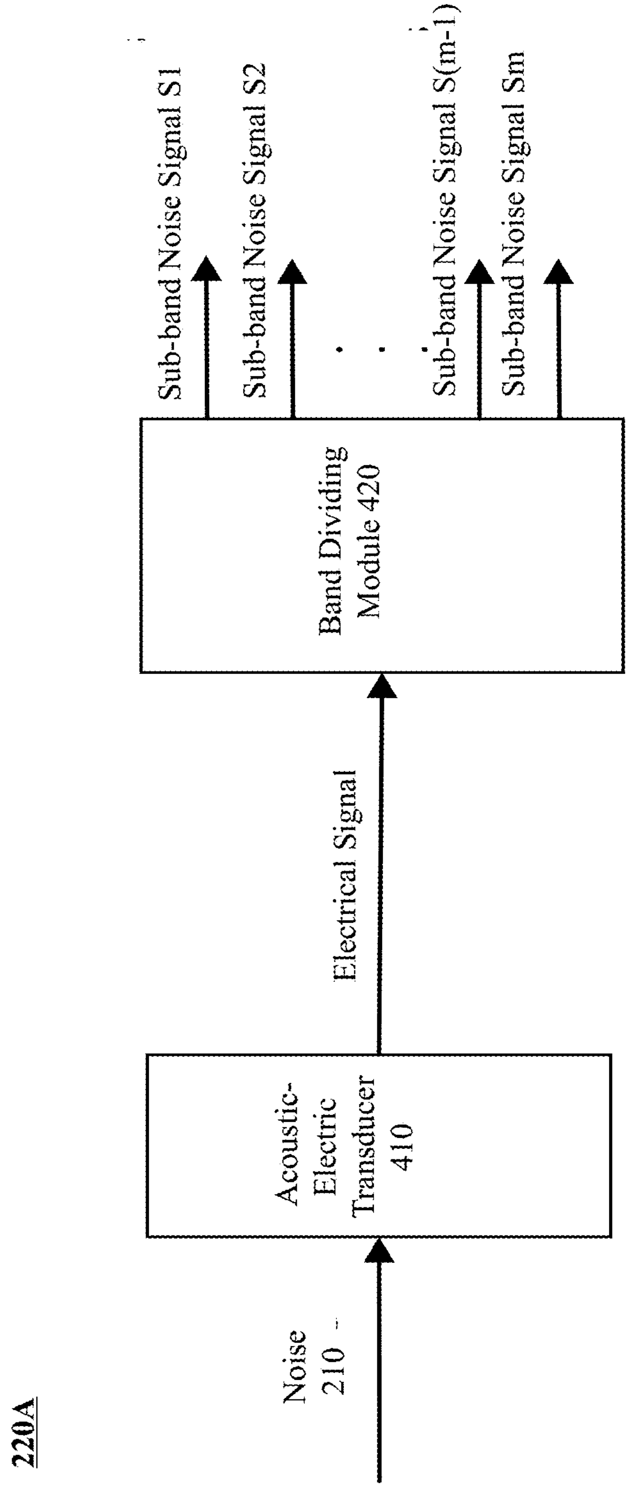
FIG. 4 is a schematic diagram illustrating an exemplary sub-band noise sensor according to some embodiments of the present disclosure.

In some embodiments, the sub-band noise signals generated by the sub-band noise sensor 220 may be digital signals or analog signals. For illustration purposes, unless stated otherwise or obvious from the context, the present disclosure is described with reference to sub-band noise signals in the form of digital signals, and not intended to limit the scope of the present disclosure. In some embodiments, the sub-band noise sensor 220 may include one or more components as illustrated in FIG. 4, which may be configured to convert the noise 210 into an electrical signal and divide the electrical signal into the sub-band noise signals. Alternatively, the sub-band noise sensor 220 may include one or more components as illustrated in FIG. 6, which may be configured to generate a plurality of sub-band noise electrical signals by processing the noise 210, and sample the sub-band noise electrical signals to generate the sub-band noise signals. More descriptions regarding the sub-band noise sensor 220 may be found elsewhere in the present disclosure. See, e.g., FIGS. 4 to 6 and relevant descriptions thereof.

The sub-band noise reduction modules 230 may include a sub-band noise reduction module 230-1, a sub-band noise reduction module 230-2, . . . , and a sub-band noise reduction module 230-*m* as shown in FIG. 2. In some embodiments, the count (or number) of the sub-band noise reduction modules 230 may be equal to the count (or number) of the sub-band noise signals generated by the sub-band noise sensor 220. Each of the sub-band noise reduction modules 230 may be configured to receive one of the sub-band noise signals from the sub-band noise sensor 220 and generate a sub-band noise correction signal for reducing the received sub-band noise signal. For example, as shown in FIG. 2, a sub-band noise reduction module 230-*i* (i being a positive integer equal to or smaller than m) may receive a sub-band noise signal Si from the sub-band noise sensor 220 and generate a sub-band noise correction signal Ci for reducing the sub-band noise signal Si.

In some embodiments, the sub-band noise signals may be transmitted via parallel transmitters from the sub-band noise sensor 220 to the sub-band noise reduction modules 230. Optionally, a sub-band noise signal may be transmitted via a transmitter according to a certain communication protocol for transmitting digital signals. Exemplary communication protocols may include AES3 (audio engineering society), AES/EBU (European broadcast union)), EBU (European broadcast union), ADAT (Automatic Data Accumulator and Transfer), I2S (Inter-IC Sound), TDM (Time Division Multiplexing), MIDI (Musical Instrument Digital Interface), CobraNet, Ethernet AVB (Ethernet Audio/VideoBridging), Dante, ITU(International Telecommunication Union)-T G.728, ITU-T G.711, ITU-T G.722, ITU-T G.722.1, ITU-T G.722.1 Annex C, AAC (Advanced Audio Coding)-LD, or the like, or a combination thereof. The digital signal may be transmitted in a certain format including a CD(Compact Disc), WAVE, AIFF (Audio Interchange File Format), MPEG (Moving Picture Experts Group)-1, MPEG-2, MPEG-3, MPEG-4, MIDI (Musical Instrument Digital Interface), WMA (Windows Media Audio), RealAudio, VQF (Transform-domain Weighted Nterleave Vector Quantization), AMR (Adaptibve Multi-Rate), APE, FLAC (Free Lossless Audio Codec), AAC (Advanced Audio Coding), or the like, or a combination thereof. In some alternative embodiments, the sub-band noise signals may be processed to a single-channel signal using, e.g., a frequency-division multiplexing technique, and transmitted to the sub-band noise reduction modules 230.

In some embodiments, the sub-band noise reduction module 230-*i* may perform a phase modulation and/or an amplitude modulation on the sub-band noise signal Si to generate the corresponding sub-band noise correction signal Ci. In some embodiments, the phase modulation and the amplitude modulation may be performed in sequence or simultaneously on the sub-band noise signal Si. For example, the sub-band noise reduction module 230-*i* may first perform a phase modulation on the sub-band noise signal Si to generate a phase modulated signal, and then perform an amplitude modulation on the phase modulated signal to generate the corresponding sub-band noise correction signal Ci. The phase modulation of the sub-band noise signal Si may include an inversion of the phase of the sub-band noise signal Si. Optionally, in some embodiments, a phase displacement (or shift) of the noise 210 may occur during its transmission from a location at the sub-band noise sensor 220 to a location at the output module 170 (e.g., from a location outside an audio broadcast device to a location at a loudspeaker within the audio broadcast device). The phase modulation of the sub-band noise signal Si may further include a compensation of the phase displacement of the sub-band noise signal Si during signal transmission. Alternatively, the sub-band noise reduction module 230-*i* may first perform an amplitude modulation on the sub-band noise signal Si to generate an amplitude modulated signal, and then perform a phase modulation on the amplitude modulated signal to generate the sub-band noise correction signal Ci. More descriptions regarding the sub-band noise reduction module 230-*i* may be found elsewhere in the present disclosure. See, e.g., FIGS. 7 to 9 and relevant descriptions thereof.

The combination module 240 may be configured to combine the sub-band noise correction signals to generate a noise correction signal as shown in FIG. 2. The combination module 240 may include any component that can combine a plurality of signals. For example, the combination module 240 may generate a mixed signal (i.e., the noise correction signal) according to a signal combination technique, such as a frequency division multiplexing technique. In some alternative embodiments, the combination module 240 may be an independent component or part of a component (e.g., an output module 170) other than the noise reduction device 200. Alternatively, the combination module 240 may be omitted and the sub-band noise correction signals may be transmitted to the output module 170 in parallel for output as described in connection with FIG. 3.

The output module 170 may be configured to receive the noise correction signal from the combination module 240. The output of the noise correction signal by the output module 170 may be performed in a similar manner with that of the ambient noise correction signal 130 as described in connection with FIG. 1A. For example, the output module 170 may convert the noise correction signal into an audio signal for output, or process the noise correction signal and convert the processed noise correction signal into an audio signal for output.

In some embodiments, one or more components of the noise reduction system 100A (or the noise reduction system 100B) may be implemented on one or more components of the noise reduction device 200, respectively or jointly. For example, the ambient noise reduction device 120 may be implemented on by one or more components of the noise reduction device 200. The sub-band noise sensor 220 of the ambient noise reduction device 120 may be spaced by a distance greater than a threshold distance from the output module 170 to detect an ambient noise. Merely by way of example, the sub-band noise sensor 220 may be mounted outside an audio broadcast device and the output module 170 may be mounted within the audio broadcast device. Additionally or alternatively, the residual noise reduction device 150 may be implemented on by one or more components of the noise reduction device 200. The sub-band noise sensor 220 of the residual noise reduction device 150 may be mounted near or within the output module 170 (e.g., located within a threshold distance from the output module 170) to detect a residual noise in noise reduction. For example, the sub-band noise sensor 220 and the output module 170 may both be mounted within an audio broadcast device near each other.

Figure 3:
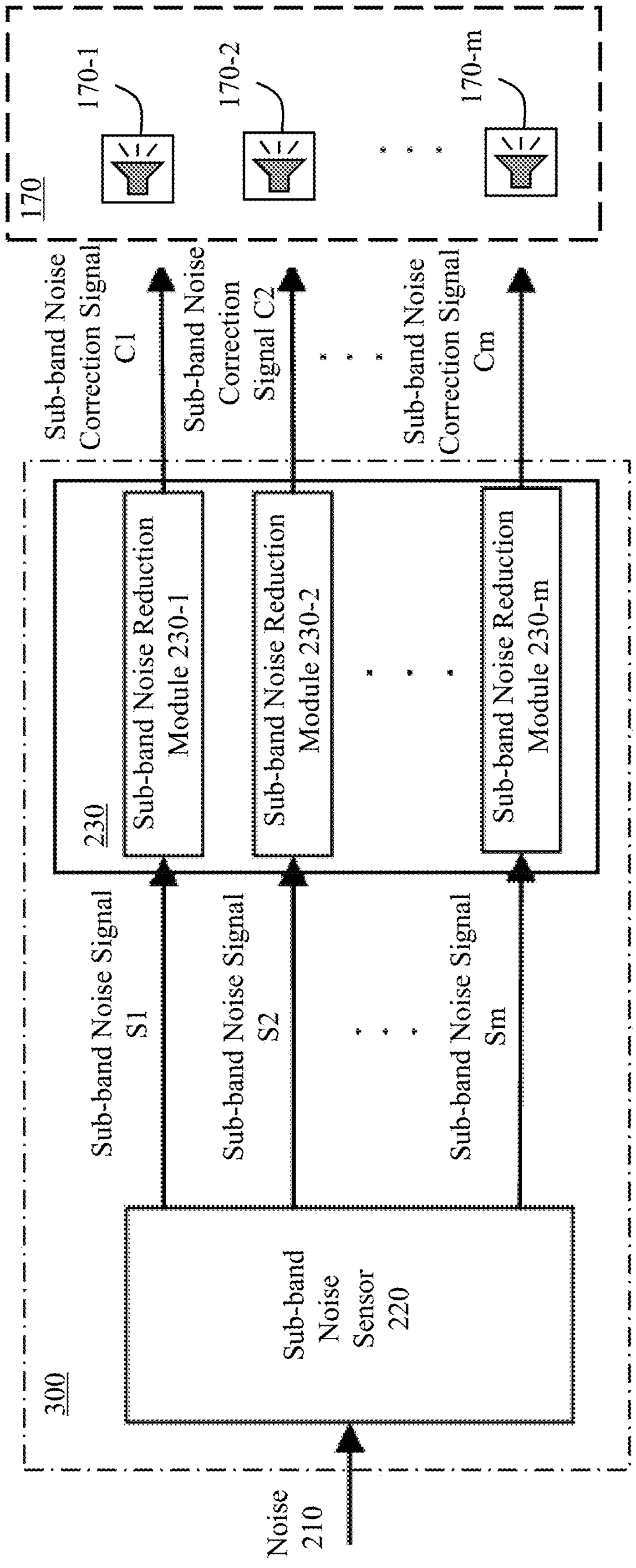
FIG. 3 is a schematic diagram illustrating an exemplary noise reduction device according to some embodiments of the present disclosure.

FIG. 3 is a schematic diagram illustrating an exemplary noise reduction device 300 according to some embodiments of the present disclosure. The noise reduction device 300 may be similar to the noise reduction device 200, except for certain components or features. As shown in FIG. 3, the output module 170 may include a plurality of output units 170-1, 170-2, . . . , and 170-*m*. The sub-band noise correction signals generated by the sub-band noise reduction modules 230 may be transmitted to the output units 170 in parallel without being combined. Each of the output units may be configured to receive one of the sub-band noise correction signals and output the received sub-band noise correction signal. In some embodiments, similar to the noise reduction device 200, the noise reduction device 300 may be used to implement one or more components of the noise reduction system 100A (or the noise reduction system 100B), such as the ambient noise reduction device 120 and/or the residual noise reduction device 150.

It should be noted that the above descriptions of the noise reduction devices 200 and 300 are intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the noise reduction device 200 and/or the noise reduction device 300 may include one or more additional components. Additionally or alternatively, one or more components of the noise reduction device 200 and/or the noise reduction device 300 described above, such as the combination module 240, may be omitted. As another example, two or more components of the noise reduction device 200 and/or the noise reduction system 300 may be integrated into a single component. Merely by way of example, the combination module 240 and/or the output module 170 of the noise reduction device 200 may be integrated into the sub-band noise reduction module 230 of the noise reduction device 200.

FIG. 4 is a schematic diagram illustrating an exemplary sub-band noise sensor 220A according to some embodiments of the present disclosure. The sub-band noise sensor 220A may be an exemplary embodiment of the sub-band noise sensor 220 as described in connection with FIG. 2. As illustrated in FIG. 4, the sub-band noise sensor 220A may include an acoustic-electric transducer 410 and a band-dividing module 420 coupled to the acoustic-electric transducer 410.

The acoustic-electric transducer 410 may be configured to detect the noise 210 and convert the noise 210 into an electrical signal. The frequency band of the electrical signal may be the same (or substantially same) as that of the noise 210. The acoustic-electric transducer 410 may include a microphone, a hydrophone, an acoustic-optic modulator (AOM), or any other device that can convert audio signals into electrical signals, or any combination thereof.

The band-dividing module 420 may be configured to divide the electrical signal into the plurality of sub-band noise signals (e.g., the sub-band noise signals S1 to Sm). In some embodiments, the band dividing module 420 may include a plurality of band-pass filters. Each of the band-pass filters may have a unique frequency response and be configured to generate one of the sub-band noise signals by processing the electrical signal. A frequency response of a band-pass filter may refer to a quantitative measure of an output spectrum of the band-pass filter (i.e., the corresponding sub-band noise signal) in response to an input (i.e., the electrical signal). For example, the frequency response of a band-pass filter may include a center frequency, a frequency bandwidth, a cutoff frequency, or the like, or any combination thereof.

In some embodiments, a combination of the frequency bands of the sub-band noise signals may cover the frequency band of the noise 210. The frequency bandwidths of different sub-band noise signals may be same as or different from each other. Additionally or alternatively, an overlap between the frequency bands of a pair of adjacent sub-band noise signals in the frequency domain may be avoided. To this end, in some embodiments, the frequency responses of two band-pass filters that generate a pair of adjacent sub-band noise signals may intersect at a certain frequency point satisfying a certain condition.

Figure 5A:
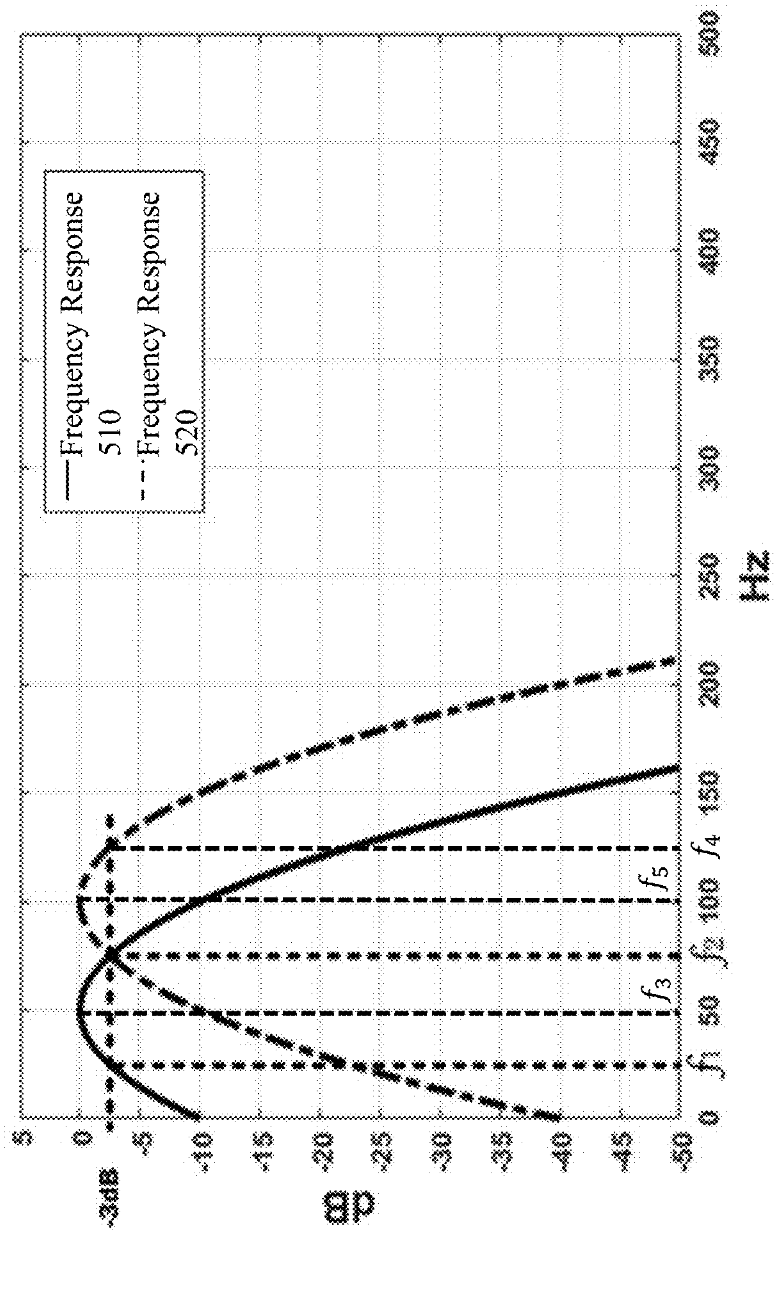
FIG. 5A illustrates an exemplary frequency response of a first band-pass filter and an exemplary frequency response of a second band-pass filter of a band dividing module according to some embodiments of the present disclosure.
Figure 5B:
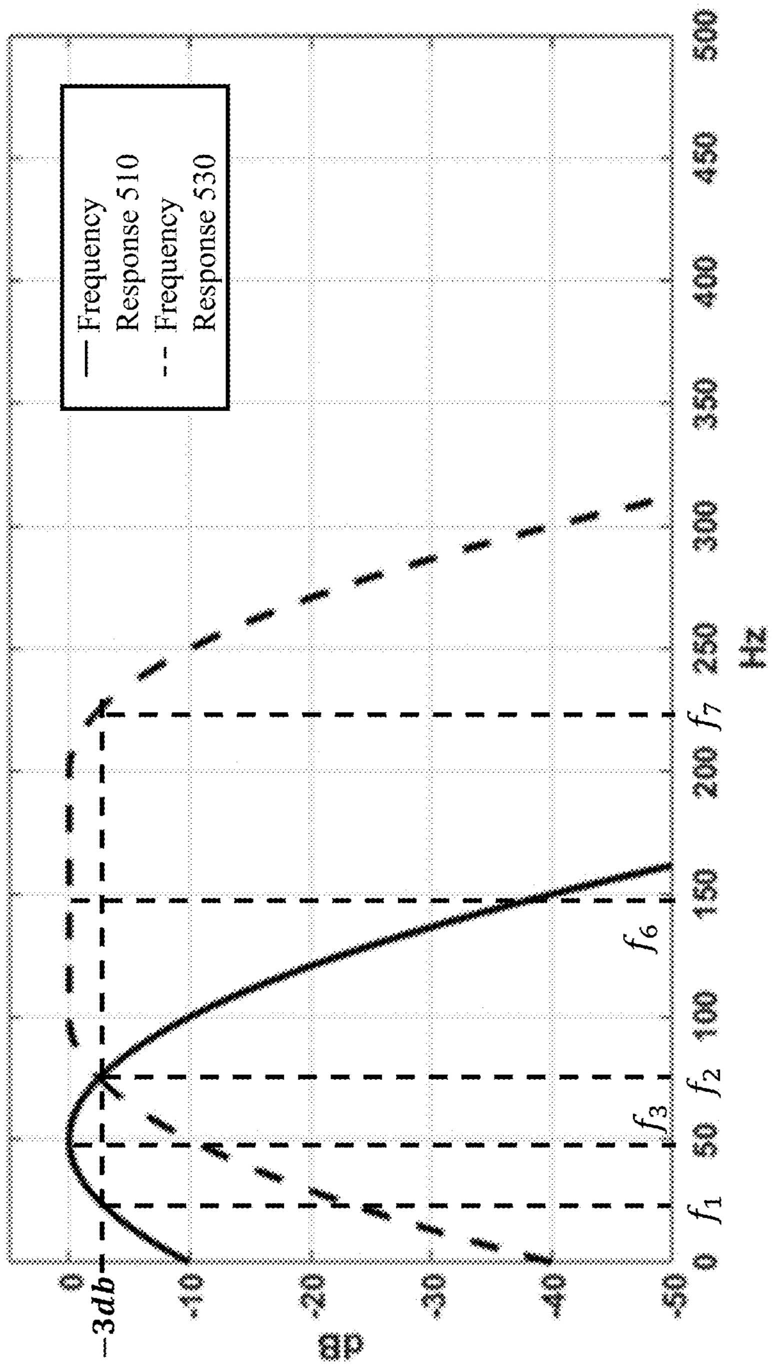
FIG. 5B illustrates the frequency response of the first band-pass filter in FIG. 5 and another exemplary frequency response of the second band-pass filter in FIG. 5 according to some embodiments of the present disclosure.
Figure 6:
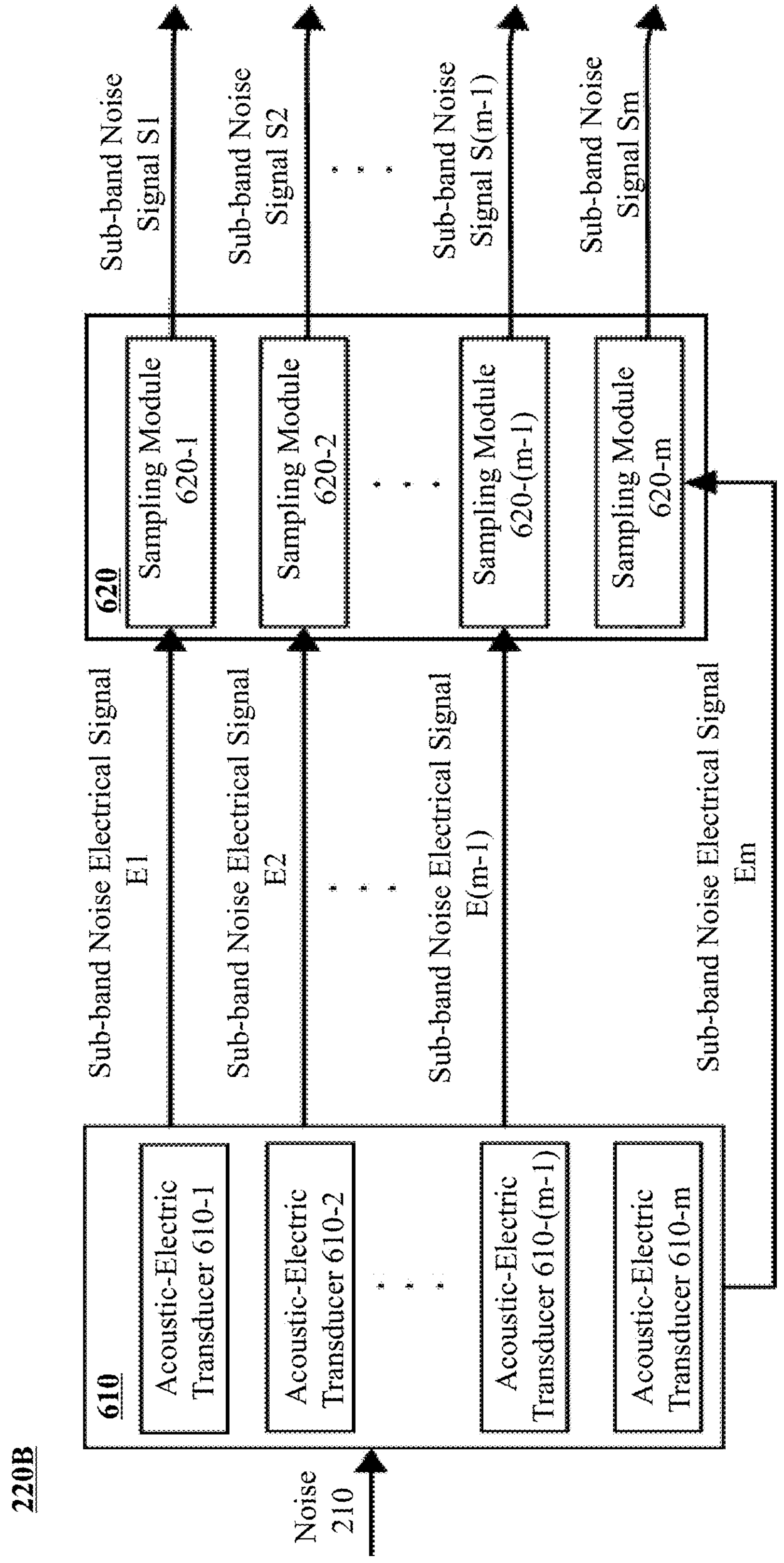
FIG. 6 is a schematic diagram illustrating an exemplary sub-band noise sensor according to some embodiments of the present disclosure.

For illustration purposes, FIG. 5A illustrates an exemplary frequency response 510 of a first band-pass filter and an exemplary frequency response 520 of a second band-pass filter according to some embodiments of the present disclosure. FIG. 5B illustrates the frequency response 510 of the first band-pass filter and another exemplary frequency response 530 of the second band-pass filter according to some embodiments of the present disclosure. The first band-pass filter may be configured to process the electrical signal generated by the acoustic-electric transducer 410 to generate a first sub-band noise signal of the sub-band noise signals. The second band-pass filter may be configured to process the electrical signal generated by the acoustic-electric transducer 410 to generate a second sub-band noise signal of the sub-band noise signals. The second sub-band noise signal may be adjacent to the first sub-band noise signal among the sub-band noise signals in the frequency domain.

In some embodiments, the frequency responses of the first and second band-pass filters may have a same frequency bandwidth. For example, as shown in FIG. 5A, the frequency response 510 of the first band-pass filter has a lower half-power point $f_1$, an upper half-power point $f_2$, and a center frequency $f_3$. As used herein, a half power point of a certain frequency response may refer to a frequency point with a specific attenuation of power level (e.g., −3 dB). The frequency bandwidth of the frequency response 510 may be equal to a difference between $f_2$ and $f_1$. The frequency response 520 of the second band-pass filter has a lower half-power point $f_2$, an upper half-power point $f_4$, and a center frequency $f_5$. The frequency bandwidth of the frequency response 520 may be equal to a difference between $f_4$ and $f_2$. The frequency bandwidths of the first and second band-pass filters may be equal to each other.

Alternatively, the frequency responses of the first and second band-pass filters may have different frequency bandwidths. For example, as shown in FIG. 5B, the frequency response 530 of the second band-pass filter has a lower half-power point $f_2$, an upper half-power point $f_7$ (which is greater than $f_4$), and a center frequency $f_6$. The frequency bandwidth of the frequency response 530 of the second band-pass filter may be equal to a difference between $f_7$ and $f_2$, which may be greater than that of the frequency response 510 of the first band-pass filter. In this way, less band-pass filters may be needed in the band-dividing module 420 to generate a plurality of sub-band noise signals to cover the frequency band of the noise 210.

In some embodiments, the frequency responses of the first band-pass filter and the second band-pass filter may intersect at a certain frequency point. In some embodiments, the certain frequency point at which the frequency responses of the first and the second band-pass filter intersects may be near a half-power point of the frequency response of the first band-pass filter and/or a half-power point of the frequency response of the second band-pass filter. Taking FIG. 5A as an example, the frequency response 510 and the frequency response 520 intersect at the upper half-power point $f_2$ of the frequency response 510, which is also the lower half-power point of the frequency response 520. As used herein, a frequency point may be considered to be near a half-power point if a power level difference between the frequency point and the half-power point is no larger than a threshold (e.g., 2 dB). In such cases, there may be less loss or repetition of energies in the frequency responses of the first and second band-pass filters, which may result in a proper overlap range between the frequency responses of the first and second band-pass filters. In some embodiments, the overlap range may be deemed relatively small when the frequency responses intersect at a frequency point with a power level larger than −5 dB and/or smaller than −1 dB. In some embodiments, center frequencies and/or bandwidths of the frequency responses of the first and second band-pass filters may be adjusted to obtain a narrower or proper overlap range between the frequency responses of the first and second band-pass filters, so as to avoid an overlap between the frequency bands of the first and second sub-band noise signals. In some embodiments, the frequency response of the band-dividing module 420 may have a power level fluctuation within ±1 dB.

It should be noted that the examples shown in FIGS. 5A and 5B are intended to be illustrative, and not to limit the scope of the present disclosure. For a person having ordinary skill in the art, multiple variations and modifications may be made under the teachings of the present disclosure. However, those variations and modifications do not depart from the scope of the present disclosure. For example, one or more parameters (e.g., the frequency bandwidth, an upper half power point, a lower half power point, and/or a center frequency) of a frequency response of the first band-pass filter and/or the second band-pass filter may be variable.

In some embodiments, the band-pass filters of the band-dividing module 420 may include a Butterworth filter, a Chebyshev filter, a Cauer filter, or the like, or any combination thereof. A steepness of an edge of the frequency response of a band-pass filter may be associated with the type and/or an order of the band-pass filter. For example, the steepness of an edge of a Butterworth filter having a certain order may be greater than that of a Chebyshev filter having the same order. The steepness of the edge of the Chebyshev filter having a certain order may be greater than that of a Cauer filter having the same order. For a certain band-pass filter having a certain center frequency, the steepness of an edge of the frequency response of the band-pass filter may increase with the order of the band-pass filter. In some embodiments, the type of a band-pass filter of the band-dividing module 420 may be selected according to the frequency band of the noise 210 to be reduced. For example, to suppress a noise with a narrow bandwidth (e.g., a frequency bandwidth smaller than a first threshold bandwidth), such as a low-frequency noise or a high-frequency noise with a narrow bandwidth, a band-pass filter having a high order (e.g., an order greater than a threshold order) and a narrow bandwidth (e.g., a frequency bandwidth smaller than a second threshold bandwidth) may be utilized. The first and second threshold bandwidths may be same as or different from each other.

In some embodiments, a band-pass filter of the band-dividing module 420 may be a finite impulse response filter whose impulse response is of finite duration or an infinite impulse response filter which depends linearly on a finite number of input samples and a finite number of previous filter outputs.

In some embodiments, the sub-band noise signals generated by the band-dividing module 420 may be outputted in parallel (e.g., via a plurality of electrical cables) for further processing. For example, each band-pass filter of the band-dividing module 420 may be electrically connected to a sub-band noise reduction module (e.g., a sub-band noise reduction module 230), wherein the sub-band noise signal generated by the band-pass filter may be transmitted to the connected sub-band noise reduction module for generating a corresponding sub-band noise correction signal. Alternatively, the sub-band noise signals may be processed to generate a single-channel signal using, e.g., a frequency-division multiplexing technique, and outputted for further processing. In some embodiments, a plurality of sub-band noise reduction modules may be integrated into the band-dividing module 420. The integrated band-dividing module may generate the sub-band noise signals and further generate a plurality of sub-band noise correction signals for reducing the sub-band noise signals. More descriptions regarding the integrated band-dividing module may be found elsewhere in the present disclosure. See, e.g., FIG. 10 and relevant descriptions thereof.

It should be noted that the above descriptions of the sub-band noise sensor 220A are intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the sub-band noise sensor 220A may include one or more additional components. Additionally or alternatively, one or more components of the sub-band noise sensor 220A described above may be omitted. As another example, two or more components of the sub-band noise sensor 220A may be integrated into a single component.

FIG. 6 is a schematic diagram illustrating an exemplary sub-band noise sensor 220B according to some embodiments of the present disclosure. The sub-band noise sensor 220B may be an exemplary embodiment of the sub-band noise sensor 220 as described in connection with FIG. 2. The sub-band noise sensor 220B may be configured to detect a noise 210 and generate a plurality of sub-band noise signals (e.g., sub-band noise signals S1 to Sm) in response to the detected noise 210.

As illustrated in FIG. 6, the sub-band noise sensor 220B may include a plurality of acoustic-electric transducers 610 (e.g., acoustic-electric transducers 610-1 to 610-*m*) and a plurality of sample modules 620 (e.g., sample modules 620-1 to 620-*m*). Each of the acoustic-electric transducers 610 may have a unique frequency response and configured to generate a sub-band noise electrical signal by processing the noise 210. The sub-band noise electrical signals generated by the acoustic-electric transducers 610 may be analog signals. Each of the sampling modules 620 may be configured to receive one of the sub-band noise electrical signals, and sample the received sub-band electrical signal to generate one sub-band noise signal of the sub-band noise signals (i.e., a digital signal).

In some embodiments, the count (or number) of the acoustic-electric transducers 610 and the count (or number) of the sampling module 620 may both equal to the count (or number) of the sub-band noise signals (i.e., m). The value of m may be associated with the frequency band of the noise 210 and the frequency bands of the generated sub-band noise signals. For example, a certain number of acoustic-electric transducers 610 may be unutilized so that a combination of the frequency bands of the sub-band noise signals may cover the frequency band of the noise 210. Additionally or alternatively, an overlap between the frequency bands of a pair of adjacent sub-band noise signals among the sub-band noise signals may be avoided.

In some embodiments, an acoustic-electric transducer 610 may include an acoustic channel component and a sound sensitive component. The acoustic channel component may form a path through which an audio signal (e.g., the noise 210) is transmitted to the sound sensitive component. For example, the acoustic channel component may include one or more chamber structures, one or more pipe structures, or the like, or a combination thereof. The sound sensitive component may convert an audio signal transmitted from the acoustic-channel component (e.g., the original noise 210 or processed noise after passing through the acoustic channel component) into an electric signal. For example, the sound sensitive component 420 may include a diaphragm, a plate, a cantilever, etc. Taking the diagram as an example, the diaphragm may be used to convert a change of sound pressure caused by an audio signal on the diaphragm surface into a mechanical vibration of the diaphragm. The sound sensitive component may be made of one or more materials including, for example, plastic, metal, piezoelectric material, or the like, or any composite material.

In some embodiments, the frequency response of an acoustic-electric transducer 610 may be associated with the acoustic structure of the acoustic channel component of the acoustic-electric transducer 610. For example, the acoustic channel component of an acoustic-electric transducer 610-*i* may have a specific acoustic structure, which may process the noise 210 before the noise 210 reaches the sound sensitive component of the acoustic-electric transducer 610-*i*. In some embodiments, the acoustic structure of the acoustic channel component may have a specific acoustic impedance, such that the acoustic channel component may function as a filter that filters the noise 210 to generate a sub-band noise. The sound sensitive component of the acoustic-electric transducer 610-*i* may then convert the sub-band noise to a sub-band noise electrical signal Ei.

In some embodiments, the acoustic impedance of the acoustic structure may be set according to the frequency band of the noise 210. In some embodiments, an acoustic structure mainly including a chamber structure may function as a high-pass filter, while an acoustic structure mainly including a pipe structure may function as a low-pass filter. Merely by way of example, the acoustic channel component may have a chamber-pipe structure. The chamber-pipe structure may be a combination of a sound capacity and an acoustic mass in serial, and an inductor-capacitor (LC) resonance circuit may be formed. If an acoustic resistance material is used in the chamber-pipe structure, a resistor-inductor-capacitor (RLC) series loop may be formed, and the acoustic impedance of the RLC series loop may be determined according to Equation (1) as below:

$$Z = R_a + j\left(\omega M_a - \frac{1}{\omega C_a}\right), \quad \text{Equation (1)}$$

where Z refers to the acoustic impedance of the acoustic channel component, ω refers to an angular frequency of the chamber-pipe structure, j refers to an unit imaginary number, $M_a$ refers to the acoustic mass, $C_a$ refers to the sound capacity, and $R_a$ refers to the acoustic resistance of the RLC series loop.

The chamber-pipe structure may function as a band-pass filter (denoted as F1). The bandwidth of the band-pass filter F1 may be adjusted by adjusting the acoustic resistance $R_a$. The center frequency $\omega_0$ of the band-pass filter F1 may be adjusted by adjusting the acoustic mass $M_a$ and/or the sound capacity $C_a$. For example, the center frequency $\omega_0$ of the band-pass filter F1 may be determined according to Equation (2) as below:

$$\omega_0 = \sqrt{M_a C_a}. \quad \text{Equation (2).}$$

In some embodiments, the frequency response of an acoustic-electric transducer 610 may be associated with a physical characteristic (e.g., the material, the structure) of the sound sensitive component of the acoustic-electric transducer 610. The sound sensitive component having a specific physical characteristic may be sensitive to a certain frequency band of the noise 210. For example, the mechanical vibration of one or more elements in the sound sensitive component may lead to change(s) in electric parameter(s) of the sound sensitive component. The sound sensitive component may be sensitive to a certain frequency band of an audio signal. The frequency band of the audio signal may cause corresponding changes in electric parameters of the sound sensitive component. In other words, the diagram may function as a filter that processes a sub-band of the audio signal. In some embodiments, the noise 210 may be transmitted to the sound sensitive component through the acoustic channel component without (or substantially without) being filtered by the acoustic channel component. The physical characteristic of the sound sensitive component may be adjusted, such that the sound sensitive component may function as a filter that filter the noise 210 and convert the filtered noise into a sub-band noise electrical signal.

Merely by way of example, the sound sensitive component may include a diaphragm, which may function as a band-pass filter (denoted as F2). The center frequency $\omega'_0$ of the band-pass filter F2 may be determined according to Equation (3) as below:

$$\omega'_0 = \sqrt{\frac{K_m}{M_m}}, \quad \text{Equation (3)}$$

where $M_m$ refers to the mass of the diaphragm, $K_m$ refers to the elasticity coefficient of the diaphragm, $R_m$ refers to a damping of the diaphragm. The bandwidth of the band-pass filter F2 may be adjusted by adjusting $R_m$. The center frequency $\omega'_0$ of the band-pass filter F2 may be adjusted by adjusting the mass of the diaphragm and/or the elasticity coefficient of the diaphragm.

As described above, the acoustic channel component or the sound sensitive component of an acoustic-electric transducer 610 may function as a filter. The frequency response of the acoustic-electric transducer 610 may be adjusted by modifying parameter(s) of the acoustic channel component (e.g. $R_a$, $M_a$, and/or $C_a$) or parameter(s) the sound sensitive component (e.g. $K_m$, and/or $R_m$). In some alternative embodiments, a combination of the acoustic channel component and the sound sensitive component may function as a filter. By modifying parameters of the acoustic channel component and the sound sensitive component, the frequency response of the combination of the acoustic channel component and the sound sensitive component may be adjusted accordingly. More descriptions regarding the acoustic channel component and/or the sound sensitive component which function as a band-pass filter may be found in, for example, PCT Application No. PCT/CN2018/105161 filed on Sep. 12, 2018 entitled "SIGNAL PROCESSING DEVICE HAVING MULTIPLE ACOUSTIC-ELECTRIC TRANSDUCERS," the contents of which are hereby incorporated by reference.

In some embodiments, the acoustic-electric transducers 610 may have certain frequency responses such that the frequency bands of the sub-band noise signals generated by the sub-band noise sensor 220B may cover the frequency band of the noise 210 and/or an overlap between the frequency bands of a pair of adjacent sub-band noise signals may be avoided. To this end, in some embodiments, the frequency responses of the acoustic-electric transducers 610 that correspond to a pair of adjacent sub-band noise signals may have the same or similar characteristics as those of the band-pass filters that generate a pair of adjacent sub-band noise signals as described in connection with FIG. 4.

For example, among the acoustic-electric transducers 610, a first acoustic-electric transducer having a first frequency response may generate a sub-band noise electrical signal that corresponds to a first sub-band noise signal of the sub-band noise signals. A second acoustic-electric transducer having a second frequency response may generate a sub-band noise electrical signal that corresponds to a second sub-band noise signal adjacent to the first sub-band noise signal in the frequency domain. The first frequency response and the second frequency response may intersect at a frequency point, which is near a half-power point of the first frequency response and/or a half-power point of the second frequency response. Merely by way of example, the first frequency response of the first acoustic-electric transducer may be similar to the frequency response 510 of the first band-pass filter as shown in FIGS. 5A and 5B. The second frequency response of the second acoustic-electric transducer may be similar to the frequency response 520 of the second band-pass filter as shown in FIG. 5A or the frequency response 530 of the second band-pass filter as shown in FIG. 5B.

In some embodiments, an acoustic-electric transducer 610 may transmit the generated sub-band noise electrical signal to a sampling module 620 through one or more transmitters. Exemplary transmitter may be a coaxial cable, a communication cable (e.g., a telecommunication cable), a flexible cable, a spiral cable, a non-metallic sheath cable, a metal sheath cable, a multi-core cable, a twisted-pair cable, a ribbon cable, a shielded cable, a double-strand cable, an optical fiber, or the like, or a combination thereof. In some embodiments, the sub-band noise electrical signals may be transmitted to the sampling module 620 via a plurality of sub-band transmitters connected in parallel. Each of the plurality of sub-band transmitters may connect to an acoustic-electric transducer 610 and transmit the sub-band noise electrical signal generated by the acoustic-electric transducer 610 to a corresponding sampling module 620. Alternatively, the sub-band noise electrical signals may be processed to a single-channel signal using, e.g., a frequency-division multiplexing technique, and transmitted to the sampling modules 620 via a single transmitter.

In some embodiments, a sampling module 620 may sample a sub-band noise electrical signal using a certain sampling frequency. In some embodiments, the sampling frequencies of different sampling modules 620 may be the same. For example, a certain sub-band noise electrical signal may have the largest center frequency among all the sub-band noise electrical signals, and the sampling frequency of each sampling module 620 may be greater than two times of the highest frequency in the frequency band of certain sub-band noise electrical signal. This may avoid a signal distortion and a frequency aliasing between the sub-band noise signals generated by the sampling modules 620. However, using a high sampling frequency (e.g., a sampling frequency higher than a threshold frequency) may cost more processing load and/or time.

Alternatively, the sampling frequencies of different sampling modules 620 may be different according to the frequency bands of the sub-band noise electrical signals to be sampled. For example, the sampling frequency of the sampling module 620-*i* may be greater than two times of the highest frequency in the frequency band of the sub-band noise electrical signal Ei. In some embodiments, the sampling module 620-*i* may sample the sub-band noise electrical signal Ei according to a band pass sampling technique. For example, the sampling frequency of the sampling module 620-*i* may be no less than two times of the frequency bandwidth of the sub-band noise electrical signal Ei and/or no greater than four times of the frequency bandwidth of the sub-band noise electrical signal Ei. As another example, assuming that the frequency band of the sub-band noise electrical signal Ei is $(f_L, f_H)$, a sampling frequency $f_s$ of the sub-band noise electrical signal Ei may be determined according to the Equation (4) as below:

$$f_s = \frac{2(f_L + f_H)}{2n+1}, \quad \text{Equation (4)}$$

where n may be the greatest integer that makes the determined $f_s$ be equal to or greater than $2(f_H-f_L)$. By using a band pass sampling technique rather than a broad band sampling technique or a low-pass sampling technique, the sampling module 620-*i* may sample the sub-band noise electrical signal Ei with a relative low sampling frequency, thereby reducing the difficulty and cost of the sampling process, and also improving the sampling quality.

In some embodiments, the sub-band noise signals generated by the sampling modules 620 with different sampling frequencies may have different sampling periods. A plurality of sub-band noise reduction modules (e.g., the sub-band noise reduction modules 230) may receive the sub-band noise signals from the sub-band noise sensor 220B and generate a plurality of sub-band noise correction signals. The sub-band noise correction signals may have different sampling periods. The sub-band noise correction signals may need to be combined to generate a noise correction signal according to some embodiments of the present disclosure as described elsewhere in this disclosure (e.g., FIG. 2 and the relevant descriptions). Before being combined, the sub-band noise correction signals may be subjected to a downsampling or an upsampling so that the sampling periods of the sub-band noise correction signals may be adjusted to a same value.

It should be noted that the above descriptions of the sub-band noise sensor 220B are intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, one or more components of the sub-band noise sensor 220B described above may be omitted. In some embodiments, the acoustic-electric transducers 610 may directly generate the sub-band noise signals in the form of digital signals by processing the noise 210, and the sampling modules 620 may be omitted. Additionally or alternatively, the sub-band noise sensor 220B may include one or more additional components.

Figure 7:
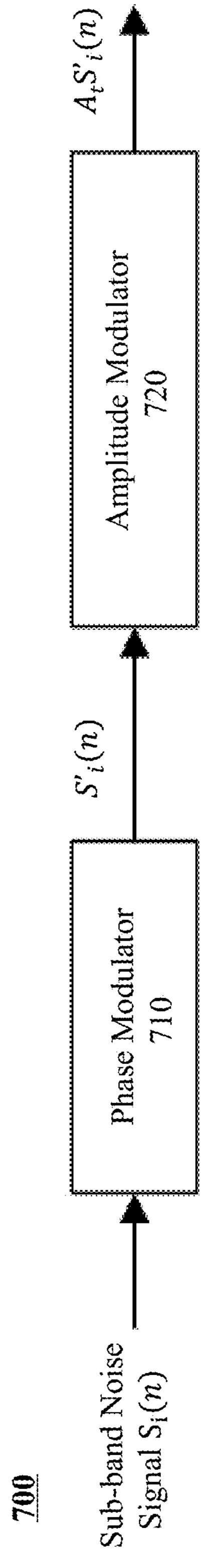
FIG. 7 is a schematic diagram illustrating an exemplary sub-band noise reduction module according to some embodiments of the present disclosure.

FIG. 7 is a schematic diagram illustrating an exemplary sub-band noise reduction module 700 according to some embodiments of the present disclosure. The sub-band noise reduction module 700 may be an exemplary embodiment of the sub-band noise reduction module 230-*i* as described in connection with FIGS. 2 and 3. The sub-band noise reduction module 700 may be configured to receive a sub-band noise signal $S_i(n)$ from a sub-band noise sensor (e.g., the sub-band noise sensor 220) and generate a sub-band noise correction signal $A_tS'_i(n)$ for reducing the sub-band noise signal $S_i(n)$. $A_t$ may refer to an amplitude attenuation coefficient relating to a noise (e.g., the noise 210) to be reduced.

Figure 8:
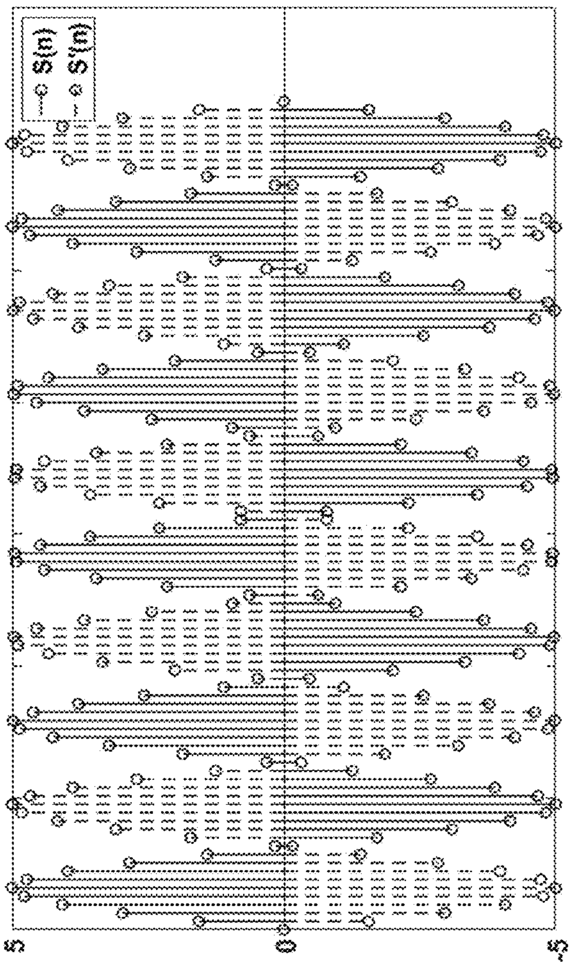
FIG. 8 is a schematic diagram illustrating an exemplary phase-modulated signal according to some embodiments of the present disclosure.

As shown in FIG. 7, the sub-band noise reduction module 700 may include a phase modulator 710 and an amplitude modulator 720. The phase modulator 710 may be configured to receive the sub-band noise signal $S_i(n)$ and generate a phase-modulated signal $S'_i(n)$ by inversing the phase of the sub-band noise signal $S_i(n)$. For example, as shown in FIG. 8, the phase-modulated signal $S'_i(n)$ may have an inverted phase to the sub-band noise signal $S_i(n)$. In some embodiments, a phase displacement (or shift) of the noise may occur during its transmission from a location at the sub-band noise sensor that generates the sub-band noise signal $S_i(n)$ to a location at an output module (e.g., the output module 170) or a portion thereof (e.g., an output unit). In some embodiments, the phase displacement may be neglected. The phase modulator 710 may generate the phase-modulated signal $S'_i(n)$ by merely performing a phase inversion on the sub-band noise signal $S_i(n)$. A sound may be transmitted in the form of a plane wave in an external auditory canal if a frequency of the sound is lower than a cutoff frequency of the external auditory canal. For illustration purposes, the external auditory canal may be considered as a tubular conduit that has a certain radius, and its cutoff frequency may be determined according to Equation (5) as below:

$$f_c = 1.84 \cdot \frac{c_0}{2\pi r}, \quad \text{Equation (5)}$$

wherein $f_c$ refers to the cutoff frequency of the external auditory canal, $c_0$ refers to a sound velocity, r refers to the radius of the external auditory canal. For example, if the sound velocity $c_0$ is equal to 340 meters per second, and the radius is equal to 3.5 millimeters (mm), the cutoff frequency $f_c$ may be approximately equal to 28.4 kilohertz (kHZ). Any sound with a frequency lower than 28.4 kHz may be transmitted in the form of a plane wave in the external auditory canal. Generally, a wave length of a noise may be far more greater than a length of the external auditory canal (e.g., 25 mm). Merely by way of example, the wave length of a noise with a frequency of 3 kHz may be approximately equal to 113 mm, which is about four times of the length of the external auditory canal. If the noise is transmitted in a form of a plane wave along a single direction during its transmission from a location at the sub-band noise sensor to a location at the output module (or a portion thereof), the phase displacement during the transmission may be small (e.g., smaller than a threshold) and can be neglected in generating the phase-modulated signal $S_i(n)$.

The amplitude modulator 720 may be configured to receive the phase-modulated signal $S'_i(n)$, and generate the correction signal $A_tS'_i(n)$ by modulating the amplitude of the phase-modulated signal $S'_i(n)$. In some embodiments, an amplitude the noise may attenuate during its transmission from a location at the sub-band noise sensor to a location at the output module (or a portion thereof). An amplitude attenuation coefficient $A_t$ may be determined to measure the amplitude attenuation of the noise during the transmission. The amplitude attenuation coefficient $A_t$ may be associated with one or more factors including, for example, the material and/or the structure of an acoustic channel component along which the noise is transmitted, a location of the sub-band noise sensor relative to and the output module (or a portion thereof), or the like, or any combination thereof. In some embodiments, the amplitude attenuation coefficient $A_t$ may be a default setting of the noise reduction system 100A (or 100B) or previously determined by an actual or simulated experiment. Merely by way of example, the amplitude attenuation coefficient $A_t$ may be determined by comparing an amplitude of an audio signal near the sub-band noise sensor (e.g., before it enters an audio broadcast device) and an amplitude of the audio signal after it is transmitted to a location at the output module. In some alternative embodiments, the amplitude attenuation of the noise may be neglected, for example, if the amplitude attenuation during the transmission of the noise is smaller a threshold and/or the amplitude attenuation coefficient $A_t$ is substantially equal to 1. In such cases, the phase-modulated signal $S'_i(n)$ may be designated as the sub-band noise correction signal of the sub-band noise signal $S_i(n)$.

In some embodiments, a noise reduction device (e.g., the noise reduction device 200, the noise reduction device 300) may include a plurality of sub-band noise reduction modules 230. Each of the sub-band noise reduction modules 230 may have a same structure as or similar structure to the sub-band noise reduction module 700 as illustrated in FIG. 7, and be configured to generate a corresponding sub-band noise correction signal. The plurality of sub-noise correction signals may be combined into one noise correction signal S(n) according to Equation (6) as below:

$$S(n)=\Sigma_{i=1}^{m}A_tS'_i(n). \quad \text{Equation (6).}$$

Figure 9:
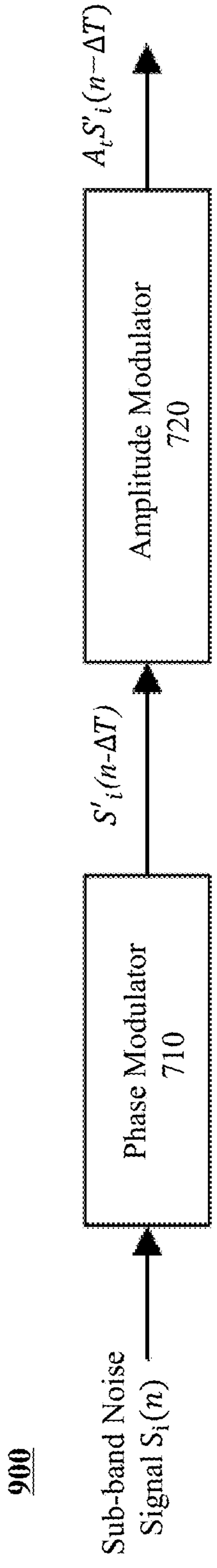
FIG. 9 is a schematic diagram illustrating an exemplary sub-band noise reduction module according to some embodiments of the present disclosure.

FIG. 9 is a schematic diagram illustrating an exemplary sub-band noise reduction module 900 according to some embodiments of the present disclosure. The sub-band noise reduction module 900 may be an exemplary embodiment of the sub-band noise reduction module 230-*i* as described in connection with FIGS. 2 and 3. The sub-band noise reduction module 900 may be similar to the sub-band noise reduction module 700, except that the phase modulator 710 of the sub-band noise reduction module 900 may be configured to modulate the phase of the sub-band noise signal $S_i(n)$ by taking the phase displacement of the sub-band noise signal $S_i(n)$ during signal transmission into consideration.

Merely by way of example, the phase of the sub-band noise signal $S_i(n)$ may have a phase displacement $\Delta\varphi$ during its transmission from a location at the sub-band noise sensor (e.g., the sub-band noise sensor 220) to a location at an output module (e.g., the output module 170) or a portion thereof (e.g., an output unit). The phase displacement $\Delta\varphi$ may be determined according to Equation (7) as below:

$$\Delta\phi = \frac{2\pi f_0}{c}\Delta d, \quad \text{Equation (7)}$$

where $f_0$ may refer to a center frequency of the sub-band noise signal $S_i(n)$, and c may refer to a travelling speed of sound. Taking the noise reduction device 200 as an example, the noise 210 to be reduced may be received from an acoustic source. If the noise 210 is a near-field signal, $\Delta d$ may refer to a difference between a distance from the acoustic source to the sub-band noise sensor 220 and a distance from the acoustic source to the output module 170 (or the output unit thereof). If the noise 210 is a far-field signal, $\Delta d$ may be equal to d cos θ, wherein d may refer to a distance between the sub-band noise sensor 220 and the output module 170 (or the output unit thereof), and θ refers to an angle between the acoustic source and the sub-band noise sensor 220 or the output module 170 (or the output unit thereof). According to Equation (6), the phase displacement $\Delta\varphi$ may increase with the increase of $\Delta d$ and the increase of $f_0$.

In order to compensate for the phase displacement $\Delta\varphi$, the phase modulator 710 may perform a phase inversion as well as a phase compensation on the sub-band noise signal $S_i(n)$ to generate a phase modulated signal. In some embodiments, the phase modulator 710 may include an all-pass filter. A filter function of the all-pass filter may be denoted as H(w), wherein w refers to an angular frequency. In an ideal situation, an amplitude response |H(w)| of the all-pass filter may be equal to 1, and a phase response of all-pass filter may be equal to the phase displacement $\Delta\varphi$. The all-pass filter may delay the sub-band noise signal $S_i(n)$ by a time delay $\Delta T$ to perform the phase compensation, $\Delta T$ may be determined according to Equation (8) as below:

$$\Delta T = \frac{\Delta\phi}{2\pi f_0} = \frac{\Delta d}{c}. \quad \text{Equation (8)}$$

In such cases, the phase modulator 710 may perform a phase inversion and a phase compensation on the sub-band noise signal $S_i(n)$ to generate a phase-modulated signal $S'_i(n-\Delta T)$ as shown in FIG. 9. The amplitude modulator 720 may further modulate the amplitude of the phase modulated signal $S'_i(n-\Delta T)$ based on the amplitude attenuation coefficient $A_t$ as described in FIG. 7, so as to generate a sub-band noise correction signal (i.e., $A_tS'_i(n-\Delta T)$) for reducing the sub-band noise signal $S_i(n)$.

In some embodiments, a noise reduction device may include a plurality of sub-band noise reduction modules 230. Each of the sub-band noise reduction modules 230 may have a same or similar structure as the sub-band noise reduction module 900 as illustrated in FIG. 9, and be configured to generate a corresponding sub-band noise correction signal.

The plurality of sub-noise correction signals may be combined into one noise correction signal S'(n) according to Equation (9) as below:

$$S'(n)=\sum_{i=1}^{m} A_t S'_i(n-\Delta T). \quad \text{Equation (9)}$$

It should be noted that the above descriptions of FIGS. 7 and 9 are intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the sub-band noise reduction modules 700 and/or 900 may include one or more additional components. Additionally or alternatively, one or more components of the sub-band noise reduction modules 700 and/or 900, such as the amplitude modulator 702, described above may be omitted.

In some alternative embodiments, the sub-band noise signals $S_i$(n) may be transmitted to the amplitude modulator 720 for amplitude modulation and then transmitted to the phase modulator 710 for phase modulation. For example, the amplitude modulator 720 may generate an amplitude modulated signal based on the amplitude attenuation coefficient $A_t$, and generate the corresponding sub-band noise correction signal by performing a phase modulation (e.g., a phase inversion and optionally a phase compensation) on the amplitude modulated signal.

Figure 10:
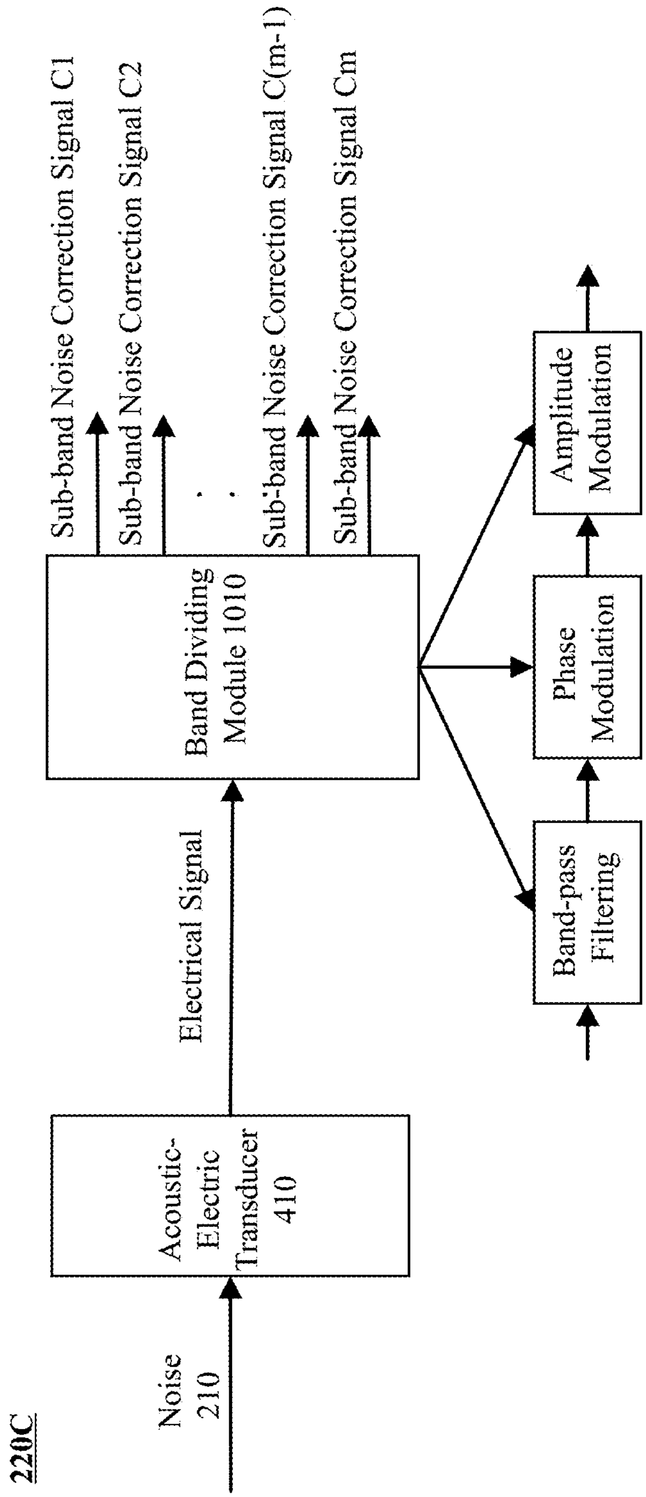
FIG. 10 is a schematic diagram illustrating an exemplary sub-band noise sensor according to some embodiments of the present disclosure.

FIG. 10 is a schematic diagram illustrating an exemplary sub-band noise sensor 220C according to some embodiments of the present disclosure. The sub-band noise sensor 220C may be an exemplary embodiment of the sub-band noise sensor 220A as described in connection with FIG. 4. The sub-band noise reduction modules (e.g., the sub-band noise reduction modules 230) may be integrated into the sub-band noise sensor 220C, such that the sub-band noise sensor 220C may implement the functions of both the sub-band noise sensor 220A and the sub-band noise reduction modules. In other words, the sub-band noise sensor 220C may be configured to detect the noise 210 to generate a plurality of sub-band noise signals and a plurality of sub-band noise correction signals for correcting the sub-band noise signals.

As illustrated in FIG. 10, the sub-band noise sensor 220C may include the acoustic-electric transducer 410 and a band-dividing module 1010. Similar to the band-dividing module 420 as described in connection with FIG. 4, the band-dividing module 1010 may include a plurality of band-pass filters, each of which may perform a band-pass filtering on the electrical signal generated by the acoustic-electric transducer 410 to generate a plurality of sub-band noise signals. Each band-pass filter may further include a digital signal processor that may implement the function of a sub-band noise reduction module (e.g., the sub-band noise reduction module 700 or 900 as described in connection with FIGS. 7 and 9). Merely by way of example, the digital signal processor may perform a phase modulation and/or an amplitude modulation on a sub-band noise signal to generate a corresponding sub-band noise correction signal. In this way, the sub-band noise reduction modules may be omitted from a noise reduction device, which may simplify the structure of the noise reduction device.

It should be noted that the above descriptions of the sub-band noise sensor 220C are intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the sub-band noise sensor 220C may include one or more additional components. Additionally or alternatively, one or more components of the sub-band noise sensor 220C described above may be omitted. In some embodiments, the band-dividing module 1010 may generate a sub-band noise correction signal without performing an amplitude modulation.

Figure 11:
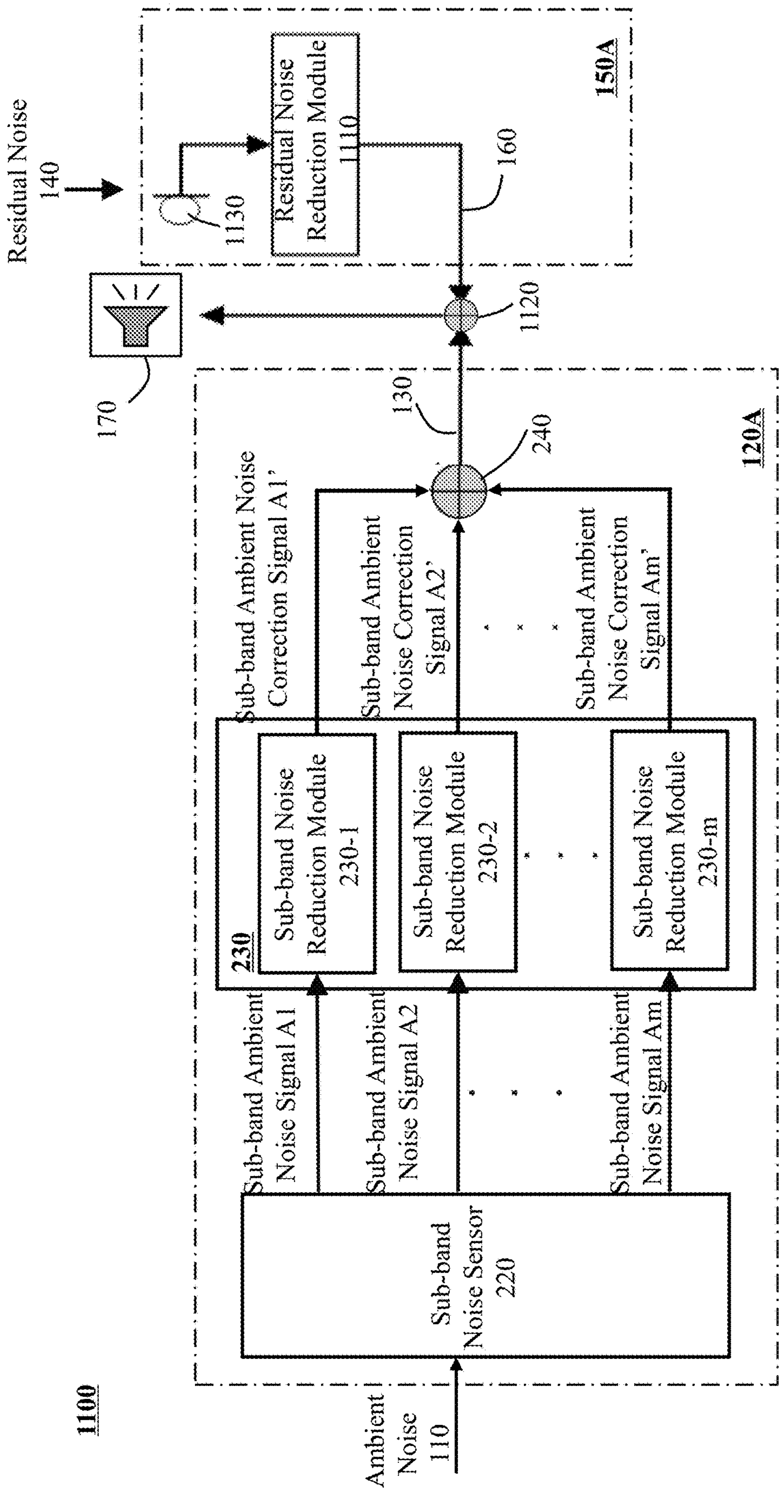
FIG. 11 is a schematic diagram illustrating an exemplary noise reduction system according to some embodiments of the present disclosure.

FIG. 11 is a schematic diagram illustrating an exemplary noise reduction system 1100 according to some embodiments of the present disclosure. The noise reduction system 1100 may be an exemplary embodiment of the noise reduction system 100A as described in connection with FIG. 1A. As illustrated in FIG. 11, the noise reduction system 1100 may include an ambient noise reduction device 120A, a residual noise reduction device 150A, a combination module 1120, and the output module 170. The ambient noise reduction device 120A and the residual noise reduction device 150A may be exemplary embodiments of the ambient noise reduction device 120 and the residual noise reduction device 150, respectively.

The ambient noise reduction device 120A may be configured to reduce an ambient noise 110 using a sub-band noise reduction technique. As shown in FIG. 11, the ambient noise reduction device 120A may have a similar structure to the noise reduction device 200 as described in connection with FIG. 2. The ambient noise reduction device 120A may include a sub-band noise sensor 220, a plurality of sub-band noise reduction modules 230, and a combination module 240. The sub-band noise sensor 220 may detect the ambient noise 110 and generate a plurality of sub-band ambient noise signals (e.g., a sub-band ambient noise signals A1 to Am). A sub-band ambient noise signal generated in response to the ambient noise 110 may be similar to a sub-band noise signal generated in response to the noise 210 as described in connection with FIG. 2.

The sub-band noise reduction modules 230 may generate a plurality of sub-band ambient noise correction signals (e.g., sub-band ambient noise correction signals A1' to Am'), each of which is used to reduce one of the sub-band ambient noise signals. A sub-band ambient noise correction signal for reducing a sub-band ambient noise signal may be similar to a sub-band noise correction signal for reducing a sub-band noise signal as described in connection with FIG. 2. The combination module 240 may combine the sub-band ambient noise correction signals to generate an ambient noise correction signal 130 and transmit the ambient noise correction signal 130 to the combination module 1120.

The residual noise reduction device 150A may be configured to reduce the residual noise 140 using a full-band noise reduction technique. The residual noise reduction device 150A may include a residual noise sensor 1130 and a residual noise reduction module 1110. The residual noise sensor 1130 may be configured to detect a residual noise 140 and generate a residual noise signal in response to the detected residual noise 140. For example, the residual noise sensor 1130 may include a single acoustic-electric transducer, which generates the residual noise signal having the same (or substantially same) frequency band as the residual noise 140. In some embodiments, the residual noise sensor 1130 may be mounted near or within the output module 170. For example, the residual noise sensor 1130 may be mounted within the output module 170 nearby an acoustic channel from which an audio signal for reducing the ambient noise 110 is generated. The residual noise reduction module 1110 may be configured to receive the residual noise signal from the residual noise sensor 1130 and generate the residual noise correction signal 160 for reducing the residual noise 140. The residual noise correction signal 160 may be transmitted from the residual noise reduction module 1110 to the combination module 1120.

In some alternative embodiments, the residual noise reduction device 150A may utilize a sub-band noise reduction technique to reduce the residual noise 140. Merely by way of example, the residual noise reduction device 150A may have a similar structure to the noise reduction device 200 as described in connection with FIG. 2. The residual noise sensor 1130 and the residual noise reduction module 1110 may have similar functions as the sub-band noise sensor 220 and the sub-band noise reduction modules 230, respectively. The residual noise signal generated by the residual noise sensor 1130 may include a plurality of sub-band residual noise signals, each of which may have a frequency band narrower than the residual noise 140. The residual noise correction signal 160 generated by the residual noise reduction module 1110 may include a plurality of sub-band residual noise correction signals for reducing the sub-band residual noise signals or be a combined signal of the sub-band residual noise correction signals.

The combination module 1120 may be configured to combine the ambient noise correction signal 130 and the residual noise correction signal 160 to generate a combined signal, which may be transmitted to the output module 170 for output. In some embodiments, the combined signal generated by the combination module 1120 may be a digital signal, and the output module 170 may convert the combined signal into an audio signal for output.

Figure 12:
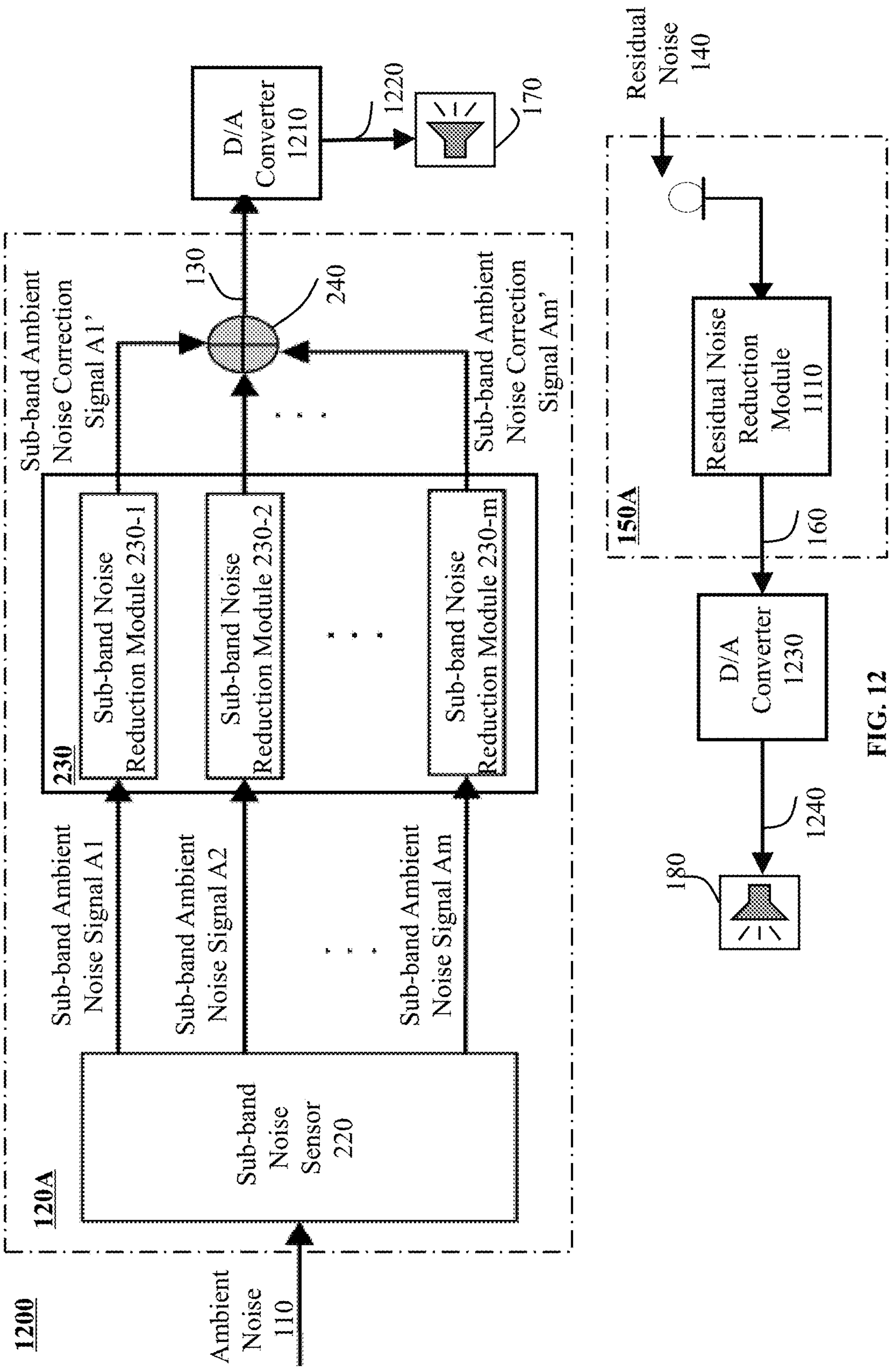
FIG. 12 is a schematic diagram illustrating an exemplary noise reduction system according to some embodiments of the present disclosure.

FIG. 12 is a schematic diagram illustrating an exemplary noise reduction system 1200 according to some embodiments of the present disclosure. The noise reduction system 1200 may be an exemplary embodiment of the noise reduction system 100B as described in connection with FIG. 1B. The noise reduction system 1200 may be similar to the noise reduction system 1100 as described in connection with FIG. 11, except for certain components or features. Compared with the noise reduction system 1100, the noise reduction system 1200 may further include a D/A converter 1210, a D/A converter 1230, and an output module 180. The ambient noise correction signal 130 generated by the ambient noise reduction device 120A and the residual noise correction signal 160 generated by the residual noise reduction device 150A may be processed and outputted, respectively, without being combined.

In some embodiments, the ambient noise correction signal 130 and the residual noise correction signal 160 may be digital signals. The D/A converters 1210 and 1230 may be configured to convert the ambient noise correction signal 130 and the residual noise correction signal 160 into analog signals 1220 and 1240, respectively. The analog signal 1220 may be further transmitted from the D/A converter 1210 to the output module 170 for output. The analog signal 1240 may be further transmitted from the D/A converter 1230 to the output module 180 for output.

Figure 13:
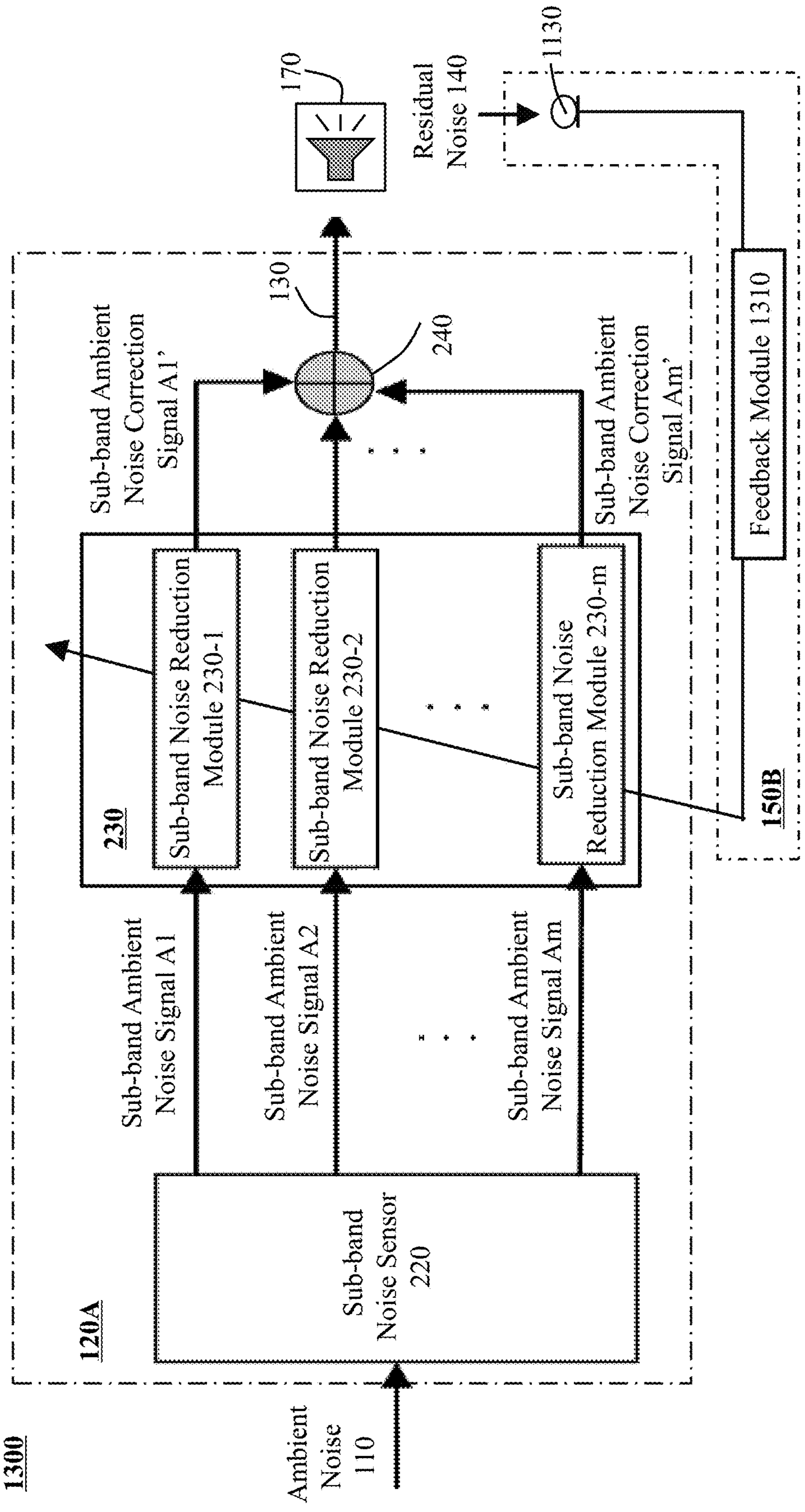
FIG. 13 is a schematic diagram illustrating an exemplary noise reduction system according to some embodiments of the present disclosure.

FIG. 13 is a schematic diagram illustrating an exemplary noise reduction system 1300 according to some embodiments of the present disclosure. The noise reduction system 1300 may be similar to the noise reduction system 1100 as described in connection with FIG. 11, except for certain components or features. As illustrated in FIG. 13, the noise reduction system 1300 may include the ambient noise reduction device 120A, a residual noise reduction device 150B, and the output module 170. The ambient noise correction signal 130 generated by the ambient noise reduction device 120A may be outputted by the output module 170.

The residual noise reduction device 150B may include a residual noise sensor 1130 and a feedback module 1310. The feedback module 1310 may be configured to adjust the sub-band noise reduction modules 230 according to the residual noise 140 in order to suppress the residual noise 140. For example, the adjustment unit may transmit an instruction to one or more of the sub-band noise reduction modules 230 to adjust one or more parameters of the sub-band noise reduction modules 230. Merely by way of example, as described elsewhere in this disclosure (e.g., FIGS. 7 to 9 and the relevant descriptions), a sub-band noise reduction module 230 may include a phase modulator (e.g., the phase modulator 710) and/or an amplitude modulator (e.g., the amplitude modulator 720). The feedback module 1310 may transmit an instruction to the sub-band noise reduction module 230 to adjust a time delay (e.g., ΔT) of the phase modulator and/or an amplitude attenuation coefficient (e.g., $A_t$) of the amplitude modulator, so that there is no or substantially no residual noise after the ambient noise 110 is suppressed by the ambient noise correction signal 130. In this way, the sub-band noise reduction module 230 may be automatically adjusted according to the residual noise 140, which improves the accuracy and stability of the noise reduction system 1300.

It should be noted that the above description of FIGS. 11 to 13 are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. A noise reduction system (e.g., any one of the noise reduction systems 1100, 1200, and 1300) may include one or more additional components and/or one or more components of the noise reduction system may be omitted. Merely by way of example, the D/A converter 1210 may be omitted from the noise reduction system 1200 or integrated into the output module 170. As another example, in the noise reduction system 1200, the combination module 240 may be omitted and the sub-band noise ambient correction signals may be transmitted to a plurality of output units of the output module 170 for output.

FIG. 14 is a schematic diagram illustrating an exemplary residual noise reduction device 150C according to some embodiments of the present disclosure. The residual noise reduction device 150C may be an exemplary embodiment of the residual noise reduction device 150, which may be used to reduce a residual noise 140 using a sub-band noise reduction technique.

As illustrated in FIG. 14, the residual noise reduction device 150C may have a similar structure to the noise reduction device 200 as described in connection with FIG. 2. The residual noise reduction device 150C may include a sub-band noise sensor 220, a plurality of sub-band noise reduction modules 230, and a combination module 240. The sub-band noise sensor 220 may be mounted near an output module 170 to detect the residual noise 140 and generate a plurality of sub-band residual noise signals (e.g., a sub-band residual noise signals R1 to Rk). The sub-band noise reduction modules 230 may generate a plurality of sub-band residual noise correction signals (e.g., a sub-band residual noise correction signals R'1 to R'k), which of which is for reducing one of the sub-band residual noise signals. The combination module 240 may combine the sub-band residual noise correction signals to generate the residual noise correction signal 160. The residual noise correction signal 160 may be further transmitted to the output module 170 for output.

In some embodiments, a sub-band noise reduction module 230-*i* may include a phase modulator (e.g., a phase inverter) configured to perform a phase inversion on a corresponding sub-band residual noise signal Ri. Because that the sub-band noise sensor 220 for detecting the residual noise 140 may be mounted near the output module 170, the sub-band noise reduction module 230-*i* may generate the corresponding sub-band residual noise correction signal Ri' without performing a phase compensation and/or an amplitude modulation on the sub-band residual noise signal Ri.

Figure 15:
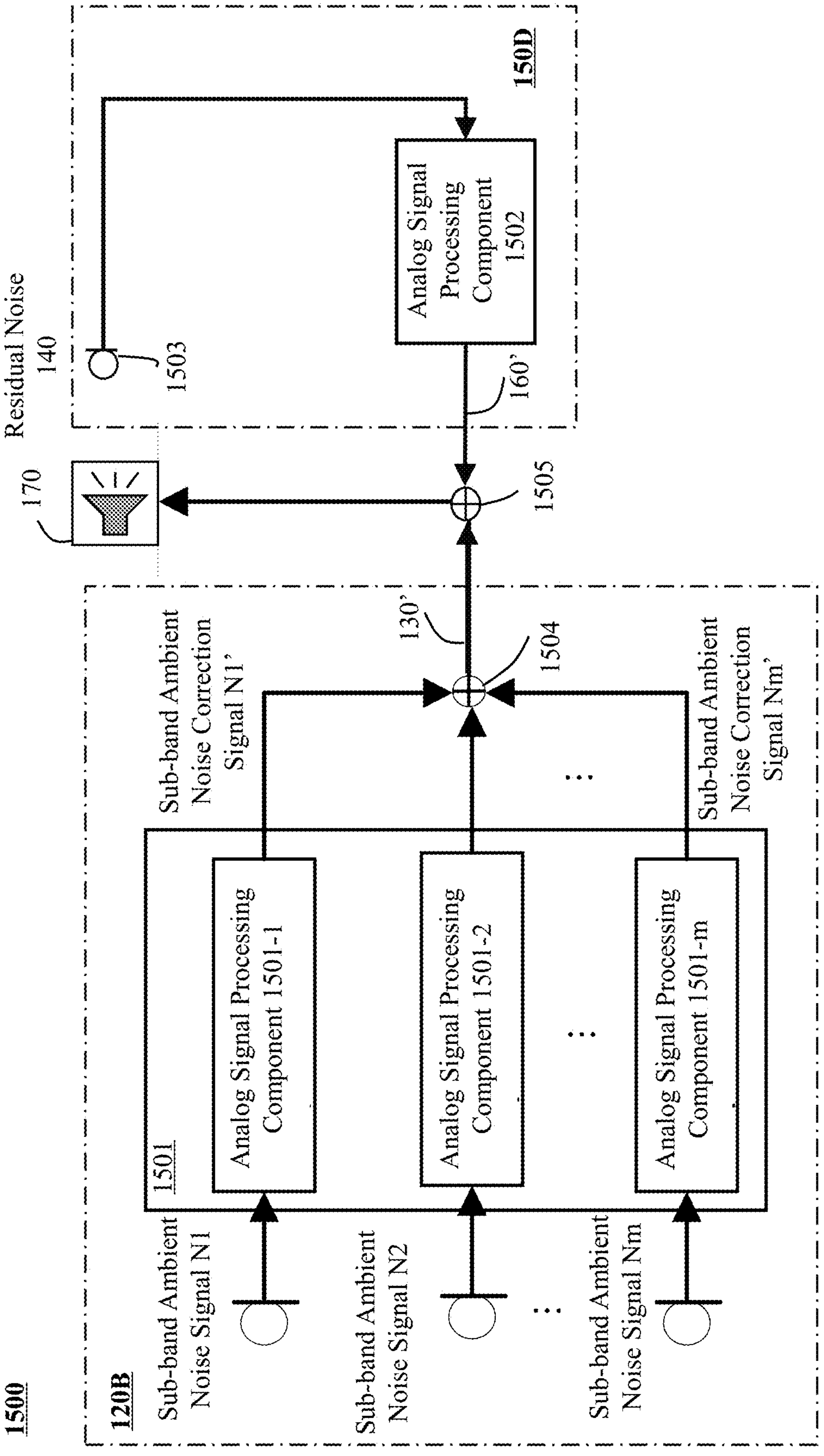
FIG. 15 is a schematic diagram illustrating an exemplary noise reduction system according to some embodiments of the present disclosure.

FIG. 15 is a schematic diagram illustrating an exemplary noise reduction system 1500 according to some embodiments of the present disclosure. The noise reduction system 1500 may be similar to the noise reduction system 1100 as described in connection with FIG. 11, except that the noise reduction system 1500 may unitize an analog signal processing technique to reduce noises. As illustrated in FIG. 15, the noise reduction system 1500 may include an ambient noise reduction device 120B, a residual noise reduction device 150D, a combination module 1505, and the output module 170.

The ambient noise reduction device 120B may include a sub-band noise sensor (not shown in FIG. 15), a plurality of analog signal processing components 1501 (e.g., analog signal processing components 1501-1 to 1501-*m*), and a combination module 1504. The sub-band noise sensor of the ambient noise reduction device 120B may detect the ambient noise 110 and generate the sub-band ambient noise signals (e.g., a sub-band ambient noise signals N1 to Nm). The sub-band ambient noise signals generated by the sub-band noise sensor of the ambient noise reduction device 120B may be analog signals.

The analog signal processing components 1501 may have a similar function as the sub-band noise reduction modules 230 of the ambient noise reduction device 120A as described in connection with FIG. 11. For example, the analog signal processing components 1501 may receive the sub-band ambient noise signals and generate a plurality of sub-band ambient noise correction signals (e.g., a sub-band ambient noise correction signals N1' to Nm'). The sub-band ambient noise correction signals generated by the analog signal processing components 1501 may be analog signals. The sub-band ambient noise correction signals may be combined by the combination module 1504 into an ambient noise correction signal 130', which may be an analog signal for reducing the ambient noise.

In some embodiments, an analog signal processing component 1501-*i* may include one or more first analog circuit components for performing a phase modulation on the sub-band ambient noise signal Ni. The phase modulation by the first analog circuit component(s) may be performed in a similar manner with that performed by a phase modulator (e.g., the phase modulator 710) as described elsewhere in this disclosure (e.g., FIGS. 7 to 9 and the relevant descriptions). For example, the first analog circuit component(s) may include an amplifier (e.g., an inverting amplifier) that is used to perform the phase inversion on the sub-band ambient noise signal Ni. Additionally or alternatively, the first analog circuit component(s) may include an analog delay line (e.g., an inductor-capacitor (LC) circuit delay line, an active analog delay line) that is used to perform a compensation for a phase displacement on the sub-band ambient noise signal Ni.

The residual noise reduction device 150D may include a residual noise sensor 1503 and an analog signal processing component 1502. The residual noise sensor 1503 may detect the residual noise 140 and generate a residual noise signal in the form of an analog signal. The analog signal processing component 1502 may be configured to generate a residual noise correction signal 160', which may be an analog signal for reducing the residual noise 140. The combination module 1505 may be configured to combine the ambient noise correction signal 130' and the residual noise correction signal 160' to generate a combined analog signal. The combined analog signal may be outputted by the output module 170.

By using analog signal processing components, the noise reduction system 1500 may reduce the ambient noise and the residual noise 140 without a sampling module (e.g., the sampling modules 620), a D/A converter (e.g., the D/A converters 1210 and 1230), a A/D converter, or the like, thereby simplify the noise reduction system 1500 and improving an operation speed of the noise reduction system 1500.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (e.g., through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system for noise reduction, comprising:

a sub-band noise sensor configured to detect a noise and generate a plurality of sub-band noise signals in response to the detected noise, each of the sub-band noise signals having a distinctive sub-band of the frequency band of the noise;

a plurality of sub-band noise reduction modules, each of the sub-band noise reduction modules being configured to receive one of the sub-band noise signals from the sub-band noise sensor and generate a sub-band noise correction signal for reducing the received sub-band noise signal; and an output module configured to receive the sub-band noise correction signals and output a noise correction signal for reducing the noise based on the sub-band noise correction signals, wherein the sub-band noise sensor comprises:

a plurality of acoustic-electric transducers, each of the plurality of acoustic-electric transducers having a unique frequency response and being configured to generate a sub-band noise electrical signal by processing the noise, wherein at least one acoustic-electric transducer of the plurality of acoustic-electric transducers comprises an acoustic channel component configured to filter the noise to generate a sub-band noise, and a sound sensitive component configured to convert the sub-band noise into a sub-band noise electrical signal; and a plurality of sampling modules, each of the sampling modules being configured to receive one sub-band noise electrical signal of the sub-band noise electrical signals, and sample the received sub-band noise electrical signal to generate one sub-band noise signal of the sub-band noise signals.

2. The system of claim 1, wherein at least one acoustic-electric transducer of the plurality of acoustic-electric transducers comprises:

a sound sensitive component configured to convert the noise to a sub-band noise electrical signal.

3. The system of claim 1, wherein:

a first acoustic-electric transducer of the plurality of acoustic-electric transducers has a first frequency response and is configured to generate a sub-band noise electrical signal corresponding to a first sub-band noise signal of the sub-band noise signals, a second acoustic-electric transducer of the plurality of acoustic-electric transducers has a second frequency response and is configured to generate a sub-band noise electrical signal corresponding to a second sub-band noise signal of the sub-band noise signals, the second sub-band noise signal being adjacent to the first sub-band noise signal among the sub-band noise signals in the frequency domain, and the first frequency response and the second frequency response intersect at a frequency point which is near at least one of a half-power point of the first frequency response or a half-power point of the second frequency response.

4. The system of claim 1, wherein the frequency bands of the sub-band noise signals generated by the sub-band noise sensor cover the frequency band of the noise.

5. The system of claim 1, wherein at least one sub-band noise reduction module of the sub-band noise reduction modules comprises:

a phase modulator configured to receive the corresponding sub-band noise signal, and generate a phase-modulated signal by modulating the phase of the corresponding sub-band noise signal; and an amplitude modulator configured to receive the phase-modulated signal from the phase modulator, and generate the sub-band noise correction signal for reducing the corresponding sub-band noise signal by modulating the amplitude of the phase-modulated signal.

6. The system of claim 5, wherein the phase modulation of the corresponding sub-band noise signal includes an inversion of the phase of the corresponding sub-band noise signal.

7. The system of claim 6, the phase modulation of the corresponding sub-band noise signal further includes a compensation of a phase displacement of the corresponding sub-band noise signal in its transmission from the sub-band noise sensor to the phase modulator.

8. The system of claim 1, wherein at least one sub-band noise reduction module of the sub-band noise reduction modules comprises:

an amplitude modulator configured to receive the corresponding sub-band noise signal, and generate an amplitude modulated signal by modulating the amplitude of the corresponding sub-band noise signal; and a phase modulator configured to receive the amplitude-modulated signal from the amplitude modulator, and generate the sub-band noise correction signal for reducing the corresponding sub-band noise signal by modulating the phase of the amplitude-modulated signal.

9. The system of claim 8, wherein the phase modulation of the amplitude-modulated signal includes an inversion of the phase of the amplitude-modulated signal.

10. The system of claim 9, wherein the phase modulation of the amplitude-modulated signal further includes a compensation of a phase displacement of the corresponding sub-band noise signal in its transmission from the sub-band noise sensor to the phase modulator.

11. The system of claim 1, wherein:

the noise correction signal includes the sub-band noise correction signals;

the output module includes a plurality of output units, and each of the output units is configured to receive one of the sub-band noise correction signals generated by the sub-band noise reduction modules and output the received sub-band noise correction signal.

12. The system of claim 1, wherein the output module is configured to:

receive the sub-band noise correction signals from the sub-band noise reduction modules;

combine the sub-band noise correction signals to generate the noise correction signal; and output the noise correction signal.

13. The system of claim 1, wherein the noise includes an ambient noise, the system further comprises:

a residual noise sensor configured to detect a residual noise and generate a residual noise signal in response to the detected residual noise, a distance between the residual noise sensor and the output module being shorter than a distance between the sub-band noise sensor and the output module; and a feedback module configured to adjust the sub-band noise reduction modules according to the residual noise.

14. The system of claim 1, wherein the acoustic channel component includes a chamber structure.

15. The system of claim 1, wherein the acoustic channel component includes a pipe structure.

* * * * *